US008388429B2

(12) United States Patent
Kukita

(10) Patent No.: US 8,388,429 B2

(45) Date of Patent: Mar. 5, 2013

(54) PLAYER TRACKING APPARATUS AND GAMING MACHINE AND CONTROL METHOD THEREOF

(75) Inventor: Noritoshi Kukita, Koto-ku (JP)

(73) Assignees: Universal Entertainment Corporation, Tokyo (JP); Aruze Gaming America, Inc., Las Vegas, NV (US)

(*) Notice: Subject to any disclaimer, the term of this patent is extended or adjusted under 35 U.S.C. 154(b) by 225 days.

(21) Appl. No.: 12/784,861

(22) Filed: May 21, 2010

(65) Prior Publication Data

US 2010/0304853 A1 Dec. 2, 2010

(30) Foreign Application Priority Data

May 29, 2009 (JP) ................................ 2009-131360

(51) Int. Cl.
*G06F 17/00* (2006.01)

(52) U.S. Cl. ................ 463/16; 463/20; 463/25; 463/29; 705/17

(58) Field of Classification Search .............. 463/16–20, 463/25, 29; 705/16, 17
See application file for complete search history.

(56) References Cited

U.S. PATENT DOCUMENTS

| | | | | |
|---|---|---|---|---|
| 6,012,983 | A | 1/2000 | Walker et al. | |
| 6,093,102 | A | 7/2000 | Bennett | |
| 6,129,275 | A * | 10/2000 | Urquhart et al. | 235/381 |
| 6,142,876 | A * | 11/2000 | Cumbers | 463/25 |
| 6,960,133 | B1 | 11/2005 | Marks et al. | |
| 7,118,478 | B2 | 10/2006 | Fayter et al. | |
| 7,212,308 | B2 * | 5/2007 | Morgan | 358/1.18 |
| 2005/0167440 | A1 * | 8/2005 | Huffer et al. | 221/92 |
| 2006/0266820 | A1 * | 11/2006 | Newburry | 235/380 |
| 2007/0077978 | A1 * | 4/2007 | Walker et al. | 463/16 |
| 2009/0104963 | A1 * | 4/2009 | Burman et al. | 463/18 |
| 2010/0004049 | A1 * | 1/2010 | Ching et al. | 463/20 |
| 2011/0124405 | A1 * | 5/2011 | Okada et al. | 463/25 |

* cited by examiner

*Primary Examiner* — Michael Cuff
(74) *Attorney, Agent, or Firm* — Lexyoume IP Meister, PLLC.

(57) ABSTRACT

A configuration is provided to execute the processing of: causing a light emitting portion to emit light in a first mode in a case where the number of cards stored in a memory is a preset first reference number or less; and causing the light emitting portion to emit light in a second mode in a case where the number of cards stored in the memory is a preset second reference number or more. In this manner, a gaming machine is provided in such a manner that a variety of information can be provided to a player and replenishment of IC cards or removal of redundant IC cards can be performed timely.

9 Claims, 18 Drawing Sheets

FIG. 18

| Remaining number of cards | Processing |
| --- | --- |
| Remaining 0 | Stop gaming machine |
| Remaining 1 to 5 | Emit LED yellow light |
| Remaining 6 to 24 | Emit LED blue light |
| Remaining 25 to 29 | Emit LED green light |
| Remaining 30 | Stop game |

PLAYER TRACKING APPARATUS AND GAMING MACHINE AND CONTROL METHOD THEREOF

CROSS-REFERENCE TO RELATED APPLICATIONS

This application is based upon and claims a priority from the prior Japanese patent Application 2009-131360 filed on May 29, 2009, the entire contents of which are incorporated herein by reference.

BACKGROUND OF THE INVENTION

1. Field of the Invention

The present invention relates to a gaming machine-equipped player tracking apparatus and gaming machine and control method thereof.

2. Description of the Related Art

Conventionally, slot machines are disclosed in U.S. Pat. No. 6,960,133, U.S. Pat. No. 6,012,983 and U.S. Pat. No. 6,093,102, for example. In these slot machines, games can be played by inserting a variety of gaming media, such as coins or cashes, into the slot machines. In addition, each slot machine is devised to pay out a payment in accordance with the state of a winning prize established with the progress of a game (the result of the game).

Further, U.S. Pat. No. 7,118,478 discloses a money exchange system for performing settlement in a coin-free manner. This system is conventionally implemented by movement between gaming machines or money exchange with the use of barcode-attached paper tickets in place of the mode of using coins as money in games, or alternatively, using tokens instead of coins.

However, in slot machines in which a payment is awarded to a player with the use of paper tickets, such printed paper tickers could be contaminated or broken by the player.

On the other hand, in recent years, the prevalence of IC cards has been remarkable, and non-contact type IC cards have been prevalent together with the latest lower price of RFID, in place of the originally introduced contact-type IC cards where electrical contacts exist.

Therefore, it is contemplated that a problem associated with ticket breakage which may accidentally occur with the use of paper tickets can be solved by making IC cards available for movement between gaming machines in casino or money exchange.

In the case where an IC card are employed in place of paper tickets, it is contemplated that there should be an approach of stocking IC cards in gaming machines, allowing the IC card to store credits awarded to a player in accordance with the results of games, and then, returning the IC card to the player from a card slot.

The player can use the returned IC card after moving it to another gaming machine, and if the balance of credits of the IC card becomes 0 in accordance with the results of games at the gaming machine, this IC card does not need to be returned to the player, and is stocked in the gaming machine.

On the other hand, it is also contemplated that there should be a system devised such that, with player-specific identification information being stored in an IC card, a player possesses and utilizes this IC card as the player-specific IC card, thereby identifying the player at a terminal device having this IC card inserted thereinto. As system of this type, for example, in a PTS (Player Tracking System), it is known that, when a player card for identifying a player is inserted, information such as the balance of an account of the player is displayed.

However, the above-described IC cards employed in place of the conventional coins or tokens are not tailored for specific players, and are reused without specifying players, so that they cannot store player-specific identification information or the like.

In casino, it is contemplated that, if specific useful information can be provided to each player, more added-values are obtained, increasing the ability to pull in more players; and thus, there is a need for a method for specifying a player.

Therefore, in the case where an IC card is employed in place of coins or tokens, as a method of identifying a player, it is contemplated that there should be a method of picking up the face of the player as an image by employing a camera or the like, and based on the picked up image, authenticating the player.

As just described, in the case of introducing a system of reusing an IC card in place of coins or tokens and a PTS-like system, there is a need to mount a variety of units, such as a camera for identifying a player in addition to slots for IC cards, and it is envisioned that: there can arise a problem that a player is impeded in the play of a game, depending upon the layout of these units; or alternatively, there is a difficulty in picking up the face of the player in the play as an image while it is appropriately included in the frame of a screen display. Therefore, a thoughtful consideration is needed for mount positions of these units relative to gaming machines.

Accordingly, it is an object of the present invention to provide a player tracking apparatus and gaming machine and control method thereof, which is capable of providing various items of information to players in gaming machines allowing games to be played by employing IC cards in place of coins or tokens.

SUMMARY OF THE INVENTION

The present invention provides a player tracking apparatus and gaming machine and a control method thereof, as described below.

A first aspect of the present invention is directed to the player tracking apparatus, including: a display panel which displays information to be provided to a player playing at a gaming machine; a camera which picks up the player as an image; a card slot which is provided lateral of the display panel, inserting and ejecting an information card storing information related to a played result in the gaming machine; and a cabinet which has the display panel, the camera, and the card slot integrally provided therein.

According to this player tracking apparatus, a player facing to a display panel can be picked up as an image by means of a camera, and in this state, a card slot is disposed lateral of the display panel, whereby the player can insert an information card into the card slot and can receive the information card ejected from the card slot, without varying a posture of the player facing to the display panel. That is, on the basis of a posture of the player facing to the display panel on which information is to be displayed, the player can be picked up as an image by means of the camera with this posture being kept; and the player can insert/remove the information card into/from the card slot with the above posture being kept. In this manner, information can be provided to a player via the display panel, and based on an image of the player picked up as an image via the camera, for example, specific information tailored for the player can be provided via the display panel. That is, in the posture of the player seeing the display panel, the player can be authenticated by means of image of the player picked up as an image by means of the camera, and based on the authentication result, the specific information can be provided to a player via the display panel. Accordingly the specific information on a player can be reliably provided. In this manner, there can be provided the service achieving enhancement of usability, in which a player can insert/remove an information card into/from a card slot while he or she is kept in a posture of playing a game at a gaming machine, and specific information can be reliably provided to the player. In this manner, a player tracking apparatus which is capable of sufficiently providing services to a player can be provided. In addition, in the player tracking apparatus, the display panel, the camera, and the card slot are integrally provided by means of a cabinet, and a positional relationship therebetween is limited, whereby, when the player tracking apparatus is mounted to a gaming machine, the positions of the display panel, the camera, and card slot can be kept, and the above-described provision of services, obtained according to the positional relationship of these units, can be thereby reliably performed.

According to the player tracking apparatus of the present invention, in addition to the aforementioned configuration, it is preferable that the cabinet has a human body detecting sensor which detects the player, upward of the card slot.

According to this player tracking apparatus, a player inserting/removing an information card into/from the card slot can be detected by the human body detecting sensor provided upward of the card slot. In this manner, for example, when an information card storing a payment is ejected from the card slot, in the case where a player has not been detected in front of the card slot within a predetermined period of time, ejection of the information card is canceled. This makes it possible to avoid the occurrence of an inconvenience that, in the case where a player eligible to receive a payment is absent, the information card may be ejected to another player.

According to the player tracking apparatus of the present invention, in addition to the aforementioned configuration, it is preferable that: the cabinet allows first and second speakers to be provided at the back side of the display panel; and ducts for voice output of the first and second speakers be provided at the left and right of the display panel.

According to this player tracking apparatus, the speakers that are unavoidable to be comparatively bulky in area are disposed at the back side of the display panel, whereby the area of a region for disposing the player tracking apparatus can be reduced. The voice output from the speakers is output from the front side of the display panel via the ducts for voice output. In this manner, the voice from the speakers that are disposed behind the back side of the display panel can be reliably output from the front side.

A second aspect of the present invention is directed to the player tracking apparatus of the first aspect, which may further includes: a card writer which stores the information related to the played result in the gaming machine to an information card; a card stacker which stacks the information cards in plurality; a detecting portion which detects the number of cards stacked on the card stacker; a memory which stores the detected number of cards; a light emitting portion which emits light in accordance with the number of cards; and a controller which is programmed to execute the processing of: (A) causing the light emitting portion to emit light in a first mode in a case where the number of cards stored in the memory is a preset first reference number or less; and (B) causing the light emitting portion to emit light in a second mode in a case where the number of cards stored in the memory is a preset second reference number or more.

According to this player tracking apparatus, in the player tracking apparatus which is capable of identifying a player and providing significant information to the player, the number of cards remaining on a card stacker can be visually recognized and kept track of from the outside in accordance with a light emitting mode of a light emitting portion. This eliminates a need to open the inside of the card stacker and check the number of cards. In particular, in a configuration allowing units for identifying a player to be mounted at their predetermined positions, in addition to these units, a light emitting portion is provided at its predetermined position, i.e., the light emitting portion is set up at an always identical position when it is seen from the outside, whereby the light emitting portion can be easily seen. In addition, in a state in which a player is kept in his or her posture of playing a game, the light emitting portion is disposed at a position at which it can be visually recognized from the player's back or lateral side, whereby the staff in casino can readily check the light emitting portion from the back side while the player is kept in his or her posture of playing a game (i.e., posture of the player being picked up as an image).

According to the player tracking apparatus of the present invention, in addition to the aforementioned configuration, it is preferable that the controller is further programmed to execute the processing of (C) stopping the progress of a game in the gaming machine in the case where the number of cards stored in the memory becomes 0.

According to this player tracking apparatus, in the case where the remaining number of cards on the card stacker becomes 0, the process of the game in the gaming machine is stopped, thereby making it possible to prevent a game from advancing in a state in which there is no information card storing a payment.

According to the player tracking apparatus of this invention, in addition to the abovementioned configuration, it is preferable that the controller is further programmed to execute the processing of (D) stopping the progress of a game in the gaming machine in the case where the number of cards stored in the memory is a predetermined upper limit.

According to this player tracking apparatus, in the case where the remaining number of cards on the card stacker becomes the upper limit, the progress of the game in the gaming machine is stopped, thereby making it possible to prevent a player from forcibly inserting an information card having information stored therein.

With a third aspect, the control method of the player tracking apparatus, of the present invention, is directed to that of the player tracking apparatus, including the following configuration. The player tracking apparatus includes: a display panel which displays information to be provided to a player playing at a gaming machine; a camera which picks up the player as an image; a card slot which is provided lateral of the display panel, inserting and ejecting an information card storing information related to a played result in the gaming machine; a cabinet which has the display panel, the camera, and the card slot integrally provided therein; a card writer which stores the information related to a played result in the gaming machine to an information card; a card stacker which stacks the information cards in plurality; a detecting portion which detects the number of cards stacked on the card stacker; a memory which stores the detected number of cards; a light emitting portion which emits light in accordance with the number of cards; and a controller, and the control method includes the steps of: (A) the controller causing the light emitting portion to emit light in a first mode in a case where the number of cards stored in the memory is a preset first reference number or less; and (B) the controller causing the light emitting portion to emit light in the second mode in a case where the number of cards stored in the memory is a preset second reference number or more.

According to the control method of this player tracking apparatus, in the control method of the player tracking apparatus, for identifying a player and providing significant information to the player, the number of cards remaining on a card stacker can be visually recognized and kept track of from the outside in accordance with a light emitting mode of a light emitting portion. This eliminates a need to open the inside of the card stacker and check the number of cards. In particular, in a configuration allowing units for identifying a player at their predetermined positions, in addition to these units, a light emitting portion is provided at its predetermined position, whereby the light emitting portion is set up at an always identical position when it is seen from the outside, and the light emitting portion can be thereby readily seen. In addition, in the state in which the player is kept in his or her posture of playing a game, the light emitting portion is disposed at a position at which it can be visually recognized from the player's back or lateral side, whereby the staff in casino facility can readily check the light emitting portion from the back side while the player is kept in his or her posture of playing a game (i.e., posture of the player being picked up as an image).

A fourth aspect of the present invention is directed to the gaming machine, including: a display which displays a game; an operating portion which is provided downward of the display, providing an input for playing the game; a display panel which displays information to be provided to a player playing the game; a camera which picks up the player as an image; a card slot which is provided lateral of the display panel, inserting and ejection an information card storing the information related to the played result in the gaming machine; and a cabinet which has the display panel, the camera, and the card slot integrally provided in an area between the display and the operating portion.

According to this gaming machine, a player facing to a display, a display panel and an operating portion (a player playing a game, facing to the gaming machine) can be picked up as an image by means of a camera, and in this state, a card slot is disposed lateral of the display panel, whereby a player can insert an information card into the card slot without a need to vary the player's posture, and can receive the information card ejected from the card slot. That is, on the basis of a posture of the player facing to the gaming machine, the player can be picked up as an image by means of the camera with this posture being kept, and the player can insert/remove the information card into/from the card slot with the above posture being kept. In this manner, information can be provided to the player facing to the gaming machine (display, display panel, and operating portion) via the display panel, and based on an image of the player picked up as an image via the camera, for example, specific information tailored for the player can be provided via the display panel. That is, in the posture of the player facing to the gaming machine, the player can be authenticated by means of the image of the player picked up by means of the camera, and based on the authentication result, specific information can be provided to the player via the display panel. The specific information concerning a player can be thereby reliably provided. In this manner, there can be provided the service achieving enhancement of usability, in which a player can insert/remove an information card into/from a card slot while he or she is kept in a posture of playing a game at a gaming machine, and specific information can be reliably provided to the player. Accordingly, a gaming machine which is capable of sufficiently providing service to a player can be provided. In addition, the display panel, the camera, and the card slot are integrally provided by means of the cabinet, and a positional relationship therebetween is limited, whereby, when these units are mounted to the gaming machine, the positions of the display panel, the camera, and the card slot can be kept, and the above-described provision of the services, obtained according to the positional relationship between these units, can be thereby reliably effected.

According to the gaming machine of the present invention, in addition to the aforementioned configuration, it is preferable that the cabinet has a human body detecting sensor which detects the player, upward of the card slot.

According to this gaming machine, a player inserting/removing an information card into/from a card slot can be detected by means of a human body detecting sensor provided upward of the card slot. In this manner, for example, when an information card storing a payment is ejected from the card slot, in the case where a player has not been detected in front of the card slot within a predetermined period of time, ejection of the information card is canceled. This makes it possible to avoid the occurrence of an inconvenience that, in the case where a player eligible to receive a payment is absent, the information card is ejected to another player.

According to the gaming machine of the present invention, in addition to the aforementioned configuration, it is preferable that: the cabinet allows first and a second speakers to be provided at the back side of the display panel; and ducts for voice output of the first and second speakers are provided at the left and right of the display panel.

According to this gaming machine, the speakers that are unavoidable to be comparatively bulky in area are disposed at the back side of the display panel, whereby the area of a region for disposing the display panel can be reduced. The voice output from the speakers is output from the front side of the display panel via the ducts for voice output. In this manner, the voice from the speakers that are disposed behind the back side of the display panel can be reliably output from the front side.

A fifth aspect of the present invention is directed to the gaming machine of the fourth aspect, which may further includes: a card writer which stores the information related to the played result in the gaming machine to an information card; a card stacker which stacks the information card in plurality; a detecting portion which detects the number of cards stacked on the card stacker; a memory which stores the detected number of cards; a light emitting portion which emits light in accordance with the number of cards; and a controller which is programmed to execute the processing of: (A) causing the light emitting portion to emit light in a first mode in a case where the number of cards stored in the memory is a preset first reference number or less; and (B) causing the light emitting portion to emit light in a second mode in a case where the number of cards stored in the memory is a preset second reference number or more.

According to this gaming machine, in the gaming machine which is capable of identifying a player and providing significant information to the player, the number of cards remaining on a card stacker can be visually recognized and kept track of from the outside in accordance with a light emitting mode of a light emitting portion provided in the gaming machine. This eliminates a need to open the inside of the card stacker and check the number of cards. In particular, in a configuration allowing units for identifying a player to be mounted at their predetermined position, in addition to these units, a light emitting portion is provided at its predetermined position, i.e., the light emitting portion is set up at an always identical position when it is seen from the outside, whereby the light emitting portion can be easily seen. In addition, in a state in which a player is kept in his or her posture of playing a game, the light emitting portion is disposed at a position at which it can be visually recognized from the player's back or lateral side, whereby the staff in casino can readily check the light emitting portion from the back side while the player is kept in his or her posture of playing a game (i.e., posture of the player being picked up as an image).

According to the gaming machine of the present invention, in addition to the aforementioned configuration, it is preferable that the controller is further programmed to execute the processing of (C) stopping the progress of the game in a case where the number of cards stored in the memory becomes 0.

According to this gaming machine, in the case where the remaining number of cards on the card stacker becomes 0, the progress of the game is stopped, thereby making it possible to prevent the game from advancing in a state in which there is no information card having a payment stored therein.

According to the gaming machine of the present invention, in addition to the aforementioned configuration, it is preferable that the controller is further programmed to execute the processing of (D) stopping the progress of the game in a case where the number of cards stored in the memory becomes a preset upper limit.

According to this gaming machine, in the case where the remaining number of cards on the card stacker becomes the upper limit, the progress of the game is stopped, thereby making it possible to prevent a player from forcibly inserting an information card having information stored therein.

With a sixth aspect, the control method of a gaming machine, of the present invention, is directed to that of a gaming machine including the following configuration. The gaming machine includes: a display which displays a game; an operating portion which is provided downward of the display, providing an input for playing the game; a display panel which displays information provided to a player playing the game; a camera which picks up the player as an image; a card slot which is provided lateral of the display panel, inserting and ejecting an information card storing the information related to the played result in the gaming machine; a cabinet which has the display panel, the camera, and the card slot integrally provided in an area between the display and the operating portion; a card writer which stores the information related to the played result of the game to an information card; a card stacker which stacks the information card in plurality; a detecting portion which detects the number of cards stacked on the card stacker; a memory which stores the detected number of cards; a light emitting portion which emits light in accordance with the number of cards; and a controller, and the control method includes the steps of: (A) the controller causing the light emitting portion to emit light in a first mode in a case where the number of cards stored in the memory is a preset first reference number or less; and (B) the controller causing the light emitting portion to emit light in a second mode in a case where the number of cards stored in the memory is a preset second reference number or more.

According to the control method of the gaming machine, in the gaming machine for authenticating a player and providing significant information to the player, the number of cards remaining on a card stacker can be visually recognized and kept track of from the outside in accordance with a light emitting mode of a light emitting portion provided in the gaming machine. This eliminates a need to open the inside of the card stacker and check the number of cards. In particular, in a configuration allowing units for identifying a player to be mounted at their predetermined position, in addition to these units, a light emitting portion is provided at its predetermined position, i.e., the light emitting portion is set up at an always identical position when it is seen from the outside, whereby the light emitting portion can be easily seen. In addition, in a state in which a player is kept in his or her posture of playing a game, the light emitting portion is disposed at a position at which it can be visually recognized from the player's back or lateral side, whereby the staff in casino can readily check the light emitting portion from the back side while the player is kept in his or her posture of playing a game (i.e., posture of the player being picked up as an image).

According to the present invention, there can be provided a player tracking apparatus and gaming machine and control method thereof, which is capable of providing a variety of information to a player, in a gaming machine allowing a game to be played using an IC card in place of coins or tokens.

BRIEF DESCRIPTION OF THE DRAWINGS

FIG. 18 is a schematic view of a table of a light emitting mode in an LED module.

DESCRIPTION OF THE PREFERRED EMBODIMENTS

Figure 1:
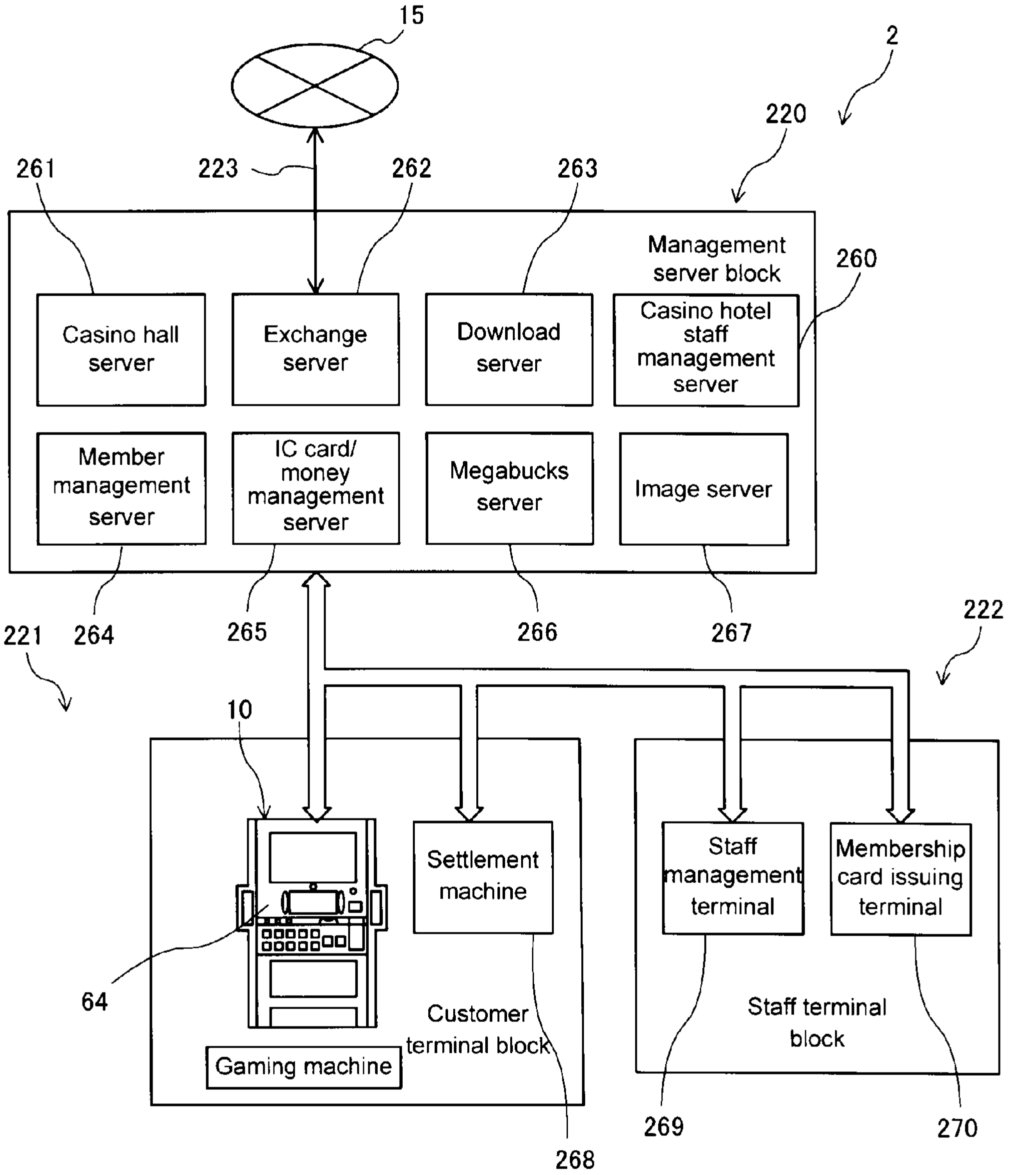
FIG. 1 is a block diagram depicting a casino system having gaming machines, of the present invention.

The following description will discuss embodiments of the present invention based on the drawings. First, with reference to FIG. 1, there will be given a general description of an embodiment of the present embodiment. FIG. 1 is a diagrammatic view schematically illustrating an overall picture of a casino system according to the first embodiment of the present invention.

A casino system 2 includes a management server block 220, a customer terminal block 221, and a staff terminal block 222.

The management server block 220 includes a casino hall server 261, an exchange server 262, a casino hotel staff management server 260, a member management server 264, an IC card/money management server 265, a megabucks server 266, and an image server 267.

The casino hall server 261 collects money flow inside a casino and makes a balance sheet and the like, and is a server for managing each server within the management server block 220. The exchange server 262 is a server for acquiring exchange information from an external source (Internet 15) through a communication line 223. The casino-hotel staff management server 260 is a server for managing attendance of staff members who work at the casino hotel, recognizing the current locations of the staff members within the casino, and the like. The member management server 264 is a server for managing member information, such as members' personal information and their past results of games. The IC card/money management server 265 is a server for collecting cashless sales with IC cards. The megabucks server 266 is a server for conducting management of a cumulative value for a progressive-jackpot offer, and determination of the progressive jackpot offer. The image server 267 is a server for storing images of the faces of staff members and players, which are captured by a camera installed inside the casino, and managing those images.

The customer terminal block 221 includes gaming machines 10 equipped with a player tracking system (PTS) terminals 64, and a settlement machine 268. The gaming machines 10 are connected to the management server block 220 through the respective PTS terminals 64, by network. In the present embodiment, a single PTS terminal 64 is provided for a single gaming machine, at a part of the related cabinet.

The staff terminal block 222 includes a staff management terminal 269 and a membership card issuing terminal 270. The staff management terminal 269 is controlled by the casino-hotel staff management server 260. The staff management terminal 269 transmits information to Personal Digital Assistant (PDA) (not illustrated) carried by the staff members, and the like, based on a signal received from the casino-hotel staff management server 260 or starts communications with mobile phones carried by the staff members.

The membership card issuing terminal 270 includes a camera which, when a membership card (IC card) is issued, captures a face image of the player to whom the IC card is issued. The captured image is stored into the image server 267, in association with a customer ID. Further, member's personal information inputted at the time of IC card issuance or at the time of membership registration is stored into the member management server 264, in association with the customer ID.

Figure 6:
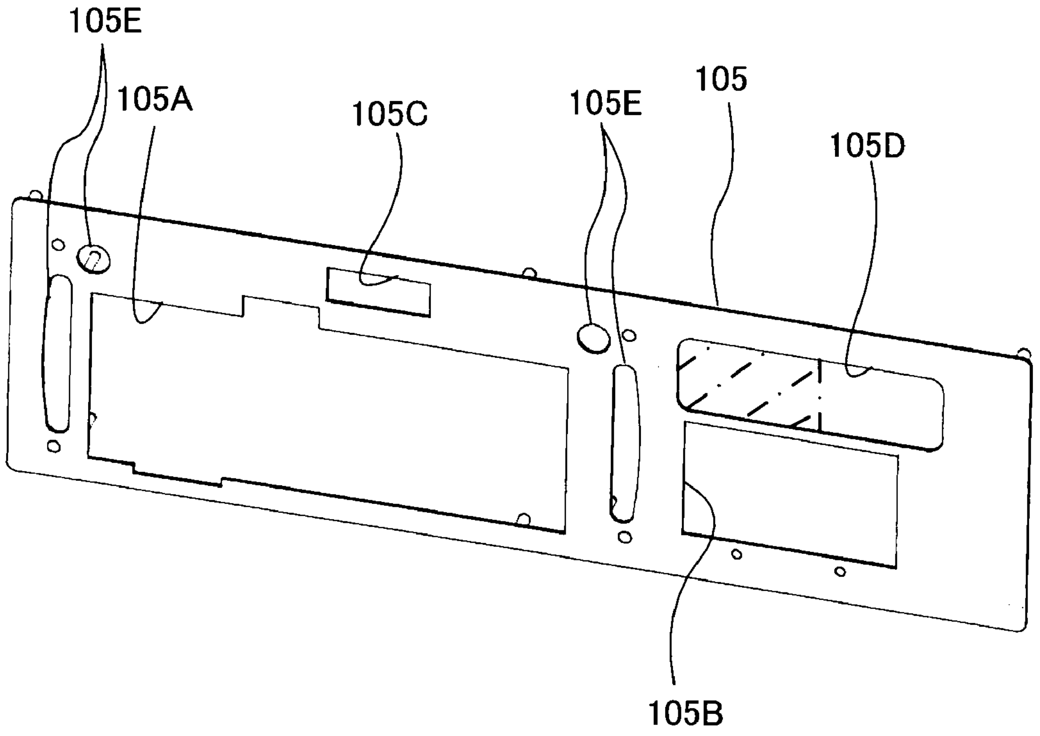
FIG. 6 is a perspective view showing a PTS panel.

In the present embodiment, the PTS terminal 64 is connected to a bill validator 22 through a communication line (see FIG. 6).

The bill validator 22 is capable of accepting bills of a plurality of countries. For example, when a Japanese bill is inserted into the bill validator 22, the PTS terminal 64 converts (exchanges) the bill into U.S. currency, based on the exchange rate. Amount-of-converted-currency data, indicating the amount of currency after the conversion (exchange), is then transmitted from the PTS terminal 64 to the gaming machine. Thus, the player can play the game on the gaming machine using currencies other than the U.S. currency. It is to be noted that the amount of currency after the conversion (exchange) is equivalent to the amount of currency obtained by subtracting the amount of currency corresponding to a predetermined fee (hereinafter, also referred to as "exchange fee") from the amount of currency before the conversion (exchange).

Also, exchange-fee data indicating the amount of currency corresponding to the exchange fee is transmitted from the PTS terminal 64 to the megabucks server 266. The megabucks server 266 updates the cumulative value for bonus, based on the amount of currency indicated by the received exchange-fee data. When the cumulative value for bonus has reached a specific value, coins are paid out as a jackpot to any of the gaming machines. As thus described, in the present embodiment, a bonus with its source of money being the exchange fee is offered.

Figure 2:
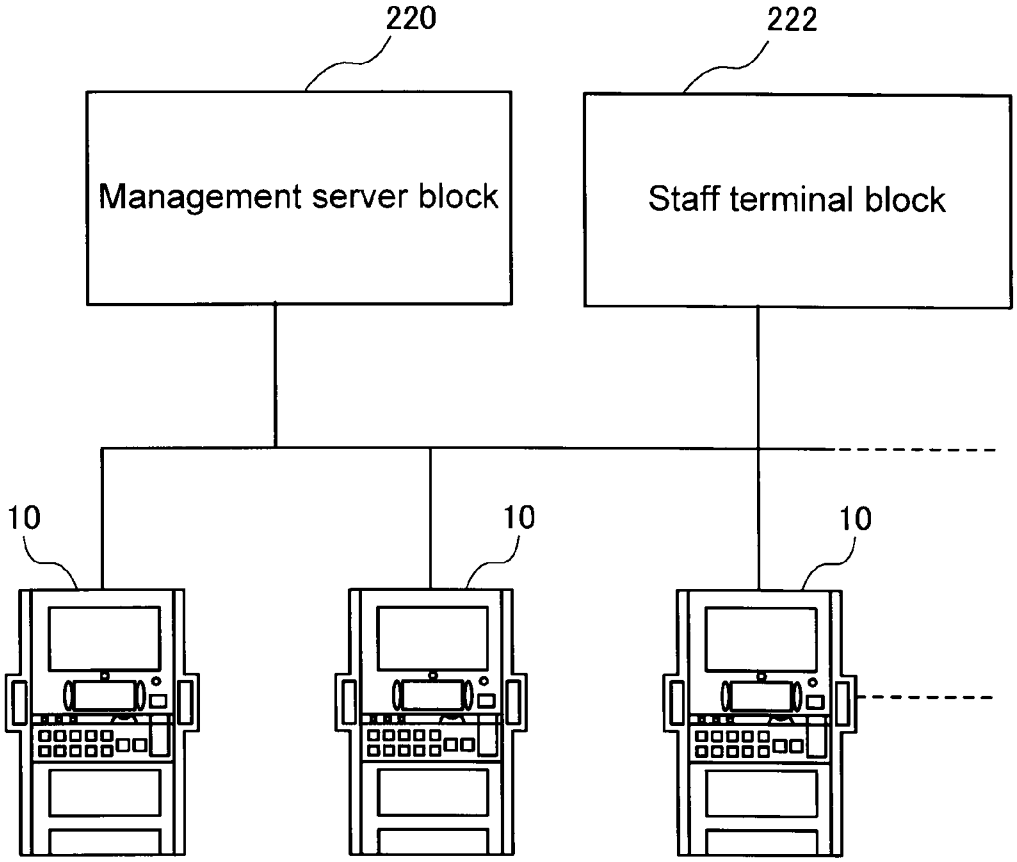
FIG. 2 is a conceptual view showing a gaming machine connection state.

FIG. 2 is a schematic view showing a casino system 2 including gaming machines, according to an embodiment of the present invention.

As shown in FIG. 2, in the casino system 2, a plurality of gaming machines 10 and a staff terminal block 222 are connected to a management server block 220 via a communication line.

The management server block 220 controls the plurality of gaming machines 10. In the embodiment, the management server block 220 is a so called hall server installed in casino having the plurality of gaming machines 10. Each of the gaming machines 10 is assigned with its own specific identification number, and the management server block 220 determines the source of data sent from such each gaming machine 10, by means of the identification number. In addition, in the case where data is transmitted from the management server block 220 to the gaming machines 10 as well, a transmission destination is specified using the identification numbers.

The casino system 2 (FIG. 1) may be constructed in one gaming facility in which a variety of games such as casino can be played, or alternatively, may be constructed among a plurality of gaming facilities. In addition, in the case of being constructed in one gaming facility, the casino system 2 may be constructed on a floor-by-floor or section-by-section basis in the game facility. The communication line may be wired or wireless, and a leased line or a switched line and the like can be employed.

Next, a functional flow of the gaming machine 10 will be described.

[Explanation of Function Flow Diagram]

Figure 3:
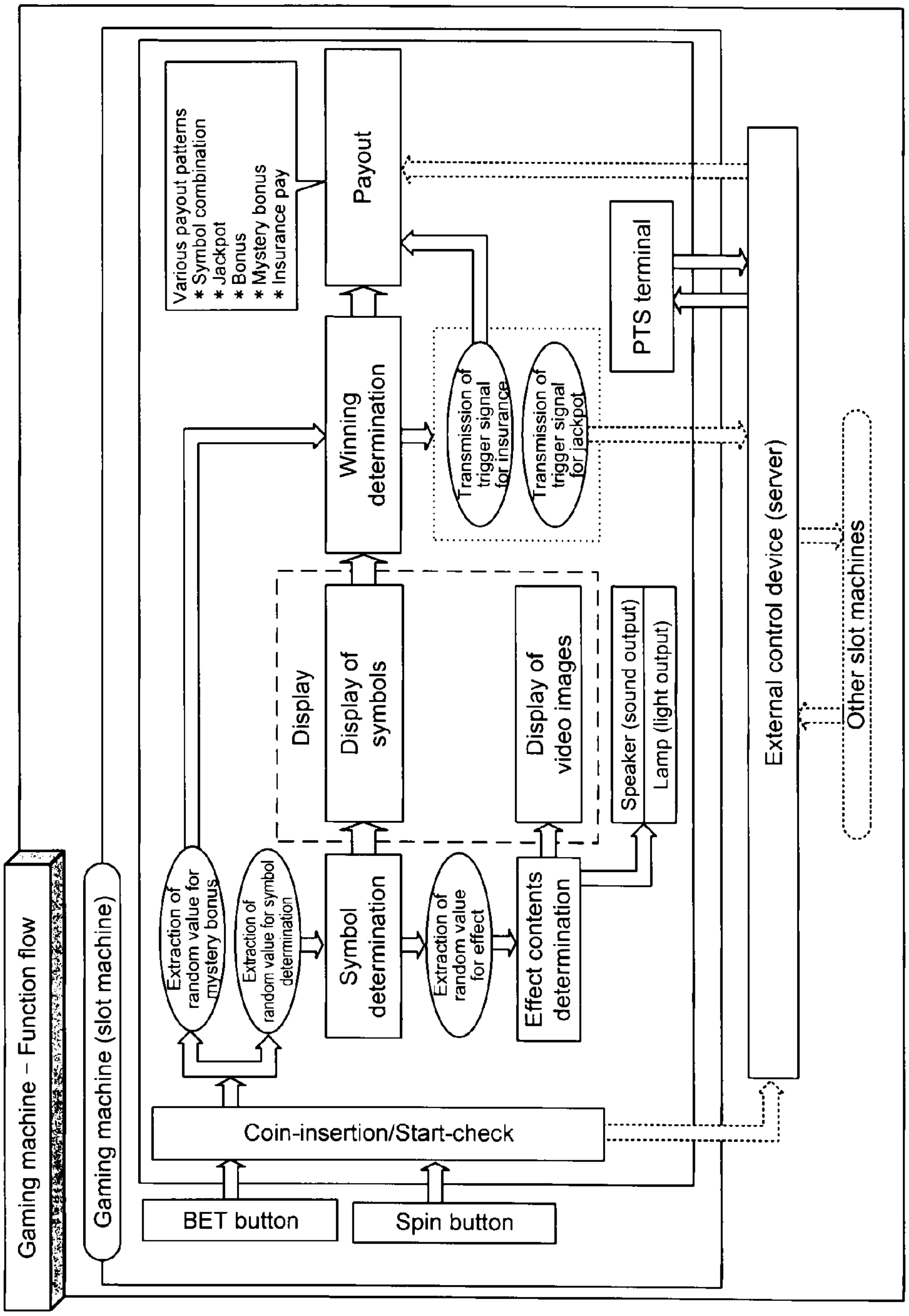
FIG. 3 is a conceptual view showing a functional flow of a gaming machine.

With reference to FIG. 3, basic functions of the gaming machine according to the present embodiment are described.

FIG. 3 is a view illustrating a function flow of the gaming machine according to the embodiment of the present invention.

<Coin-Insertion/Start-Check>

First, the gaming machine checks whether or not a BET button has been pressed by the player, and subsequently checks whether or not a start button 23 (FIG. 5) has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits (payment) according to the combination to the player. For example, when a combination of symbols related to a payout of coins has been displayed, the gaming machine pays out coins of the number corresponding to the combination of symbols to the player. Upon this payout, credit information, which corresponds to the number of coins to be paid out, can be written into an IC card, in place of paying out actual coins.

Further, when a combination of symbols (trigger symbols) related to a free game trigger has been displayed the gaming machine starts the free game.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine. In each game, the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine includes benefits such as a mystery bonus and insurance. The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus by lottery.

The insurance is a function provided for a purpose of relieving the player from a situation in which a free game has not been played for long periods of time. In the present embodiment, the player can arbitrarily select whether or not to make the insurance effective. Making insurance effective requires a predetermined insurance-purchase amount to be paid in exchange. In the case where the insurance has been made effective, the gaming machine starts counting the number of games. The gaming machine conducts a payout of coins of the amount that is set for the insurance, when the number of counted games has reached a previously determined number of times without a large amount of payout relating to a free game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Entire Structure of Gaming Machine]

Figure 4:
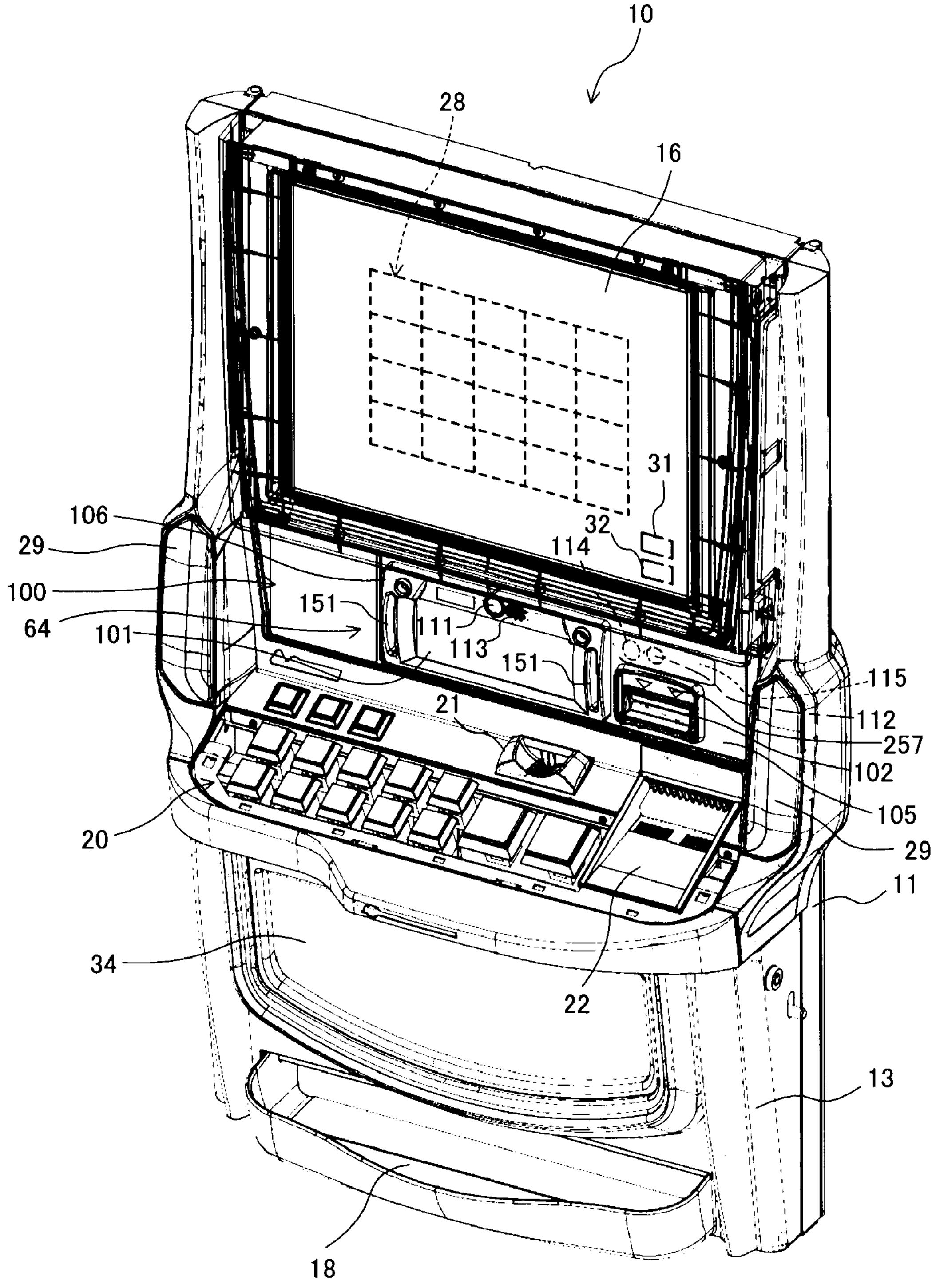
FIG. 4 is a perspective view showing the gaming machine.

Next, a configuration of the gaming machine 10 will be described. FIG. 4 is a perspective view showing an appearance of one of the gaming machines configuring a gaming system according to the embodiment.

In the gaming machine 10, coins, bills (basic currencies and any other one) or electronic valuables information corresponding thereto are employed as gaming media. In addition, in the case where a payment is awarded to a player in accordance with the result of a game, it is also possible to write credit information into an IC card in place of awarding coins, and then, award the written IC card to the player.

The gaming machine 10 comprises: a cabinet 11; an image display panel 16 which is provided at an upper part of the cabinet 11; and a front door 13 which is provided at a lower front side of the cabinet 11.

The image display panel 16 comprises a transparent crystal panel, and a plurality of display blocks 28 are displayed as video reels. A respective one of the symbols is displayed in each of the display blocks 28. Further, although not shown, apart from the above-described images, a variety of images related to effects are displayed on the image display panel 16.

In addition, a number-of-credits display portion 31 and a number-of-payouts display portion 32 are set on the image display panel 16. At the number-of-credits display portion 31, the number of credited coins is displayed by means of image. At the number-of-payouts display portion 32, the number of coins to be paid out is displayed by means of image. In the case where an IC card has been inserted through a card slot to be described later, in place of a coin, the credit information read from the inserted IC card is displayed at the number-of-credit display portion 31, and the number of credits is used as coins. In the case where the number of credits is written into the IC card in place of paying out coins, the number of credits written into this IC card is displayed at the number-of-payouts display portion 32.

Further, although not shown, a touch panel is provided on the front face of the image display panel 16, allowing a player to input a variety of commands by operating this touch panel.

A speaker 29 is provided in a cabinet 11, and an effect sound according to the progress of a game is output.

Those provided on the lower side of the image display panel 16 are: a control panel 20 made of a plurality of buttons 23 to 27 (to be described later) for a player to input a command related to the progress of a game; a coin receiving slot 21 for receiving coins in the cabinet 11; and a bill validator 22.

Figure 5:
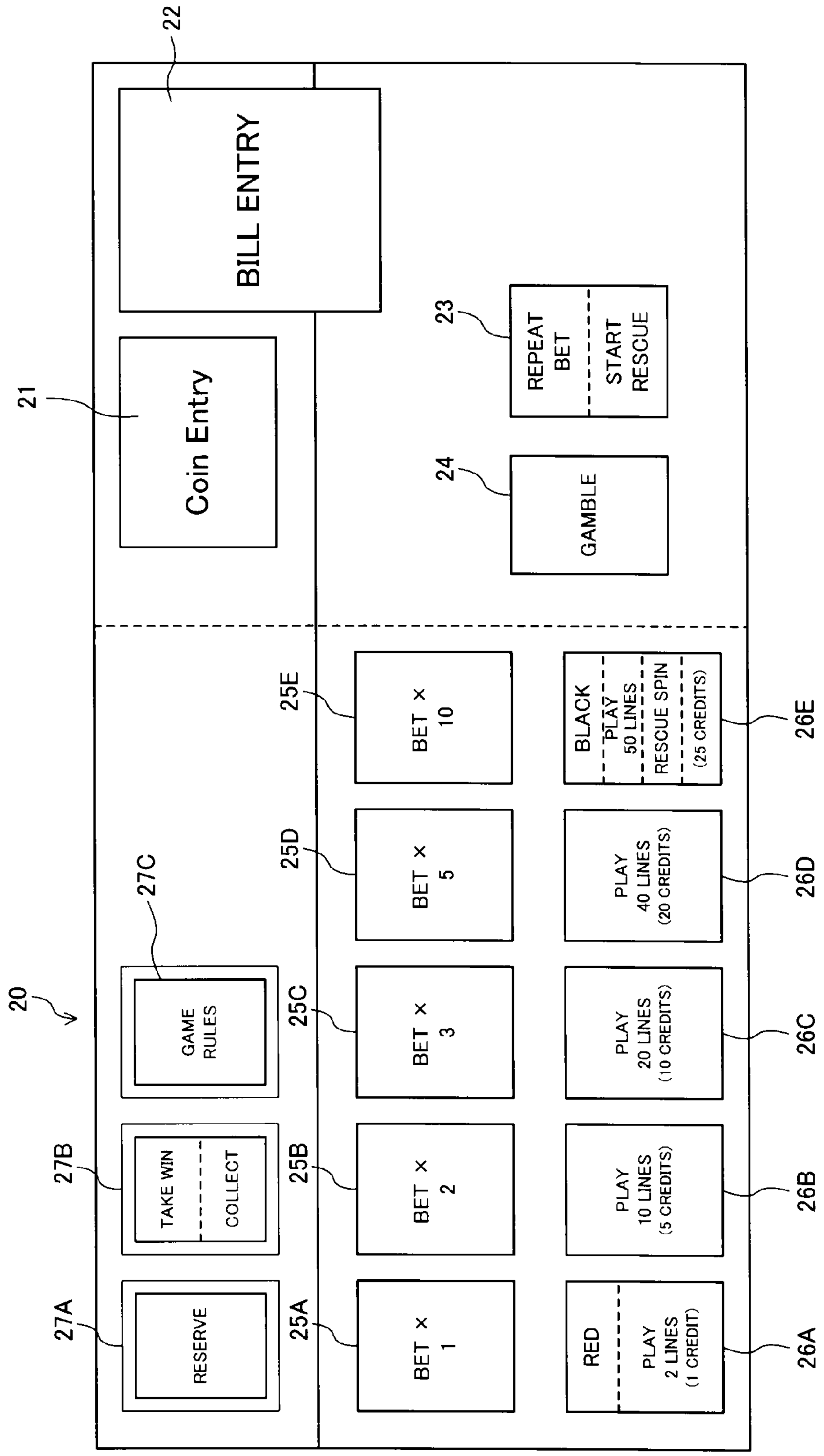
FIG. 5 is a schematic view of a control panel of the gaming machine.

As shown in FIG. 5, those provided on the control panel 20 are: a start button 23; a GAMABLE button 24; BET buttons (a 1-BET button 25A to a 10-BET button 25E); line selection buttons (a 2-line selection button 26A and a 50-line selection button 26E); a RESERVE button 27A; a TAKE WIN/COLLECT button 27B; and a GAME RULES button 27C.

The start button 23 is for inputting a command of starting scrolling of symbols. The TAKE WIN/COLLECT button 27B is for inputting a command of paying out credited coins in a coin tray 18 or a command of writing credit information corresponding to the credited coins into an IC card.

The 1-BET button 25A is for inputting a command of betting one coin on a game among the credited coins; the 2-BET button 25B is for inputting two coins in a game among the credited coins; the 3-BET button 25C is for inputting a command of betting three coins on a game among the credited coins; the 5-BET button 25D is for inputting a command of betting five coins on a game among the credited coins; and the 10-BET button 25E is for inputting a command of betting 10 coins on a game among the credited coins.

The line selection buttons 26A to 26E are for specifying symbol arrays of a plurality of display blocks 28 displayed on the image display panel 16, as the subject of BET. The 2-line selection button 26A is a button for selecting two symbol arrays; the 10-line selection button 26B is a button for selecting 10 symbol arrays; the 20-line selection button 26C is a button for selecting 20 symbol arrays; the 40-line selection button 26D is a button for selecting 40 symbol arrays; and the 50-line selection button 26E is a button for selecting 50 symbol arrays.

The bill validator 22 validates whether or not a bill (basic currency) is valid and accepts a regular bill in the cabinet 11. This bill validator 22 can accept bills available in a plurality of countries other than basic currencies, and can read the validity, type, or number of accepted bills.

In FIG. 4, a belly glass 34 having an animation character or the like of the gaming machine 10 drawn thereon is provided at the lower front of a front door 13, i.e., downward of the control panel 20.

An area for PTS (Player Tracking System) terminal (PTS terminal area 100) is provided between the image display panel 16 and a control panel 20, and a PTS terminal 64 is arranged in this PTS terminal area 100.

The PTS terminal 64 is a device which receives various items of information from the management server block 220 (FIG. 1) and provides the received information to a player. Those provided at the front part of the PTS terminal 64 are: an LCD display portion 101 for displaying various items of information received from the management server block 220; a card slot 102 for inserting and ejecting an IC card; a player identifying portion for identifying a player (camera 111, microphone 113, human body detecting sensor 115); an LED module 257 which emits light with a color responsive to the remaining number of IC cards stock therein; and a duct 151 for outputting an effect sound or the like. A touch panel is provided on the LCD display portion 101.

The card slot 102 is provided lateral of the LCD display portion 101 (right side in the case of the embodiment). In this manner, a player can insert an IC card into the card slot 102 by one hand (right hand in the case of the embodiment), or alternatively, receive the IC card ejected from the card slot 102, without a need to change a posture, while seeing the LCD display portion 101.

Figure 11:
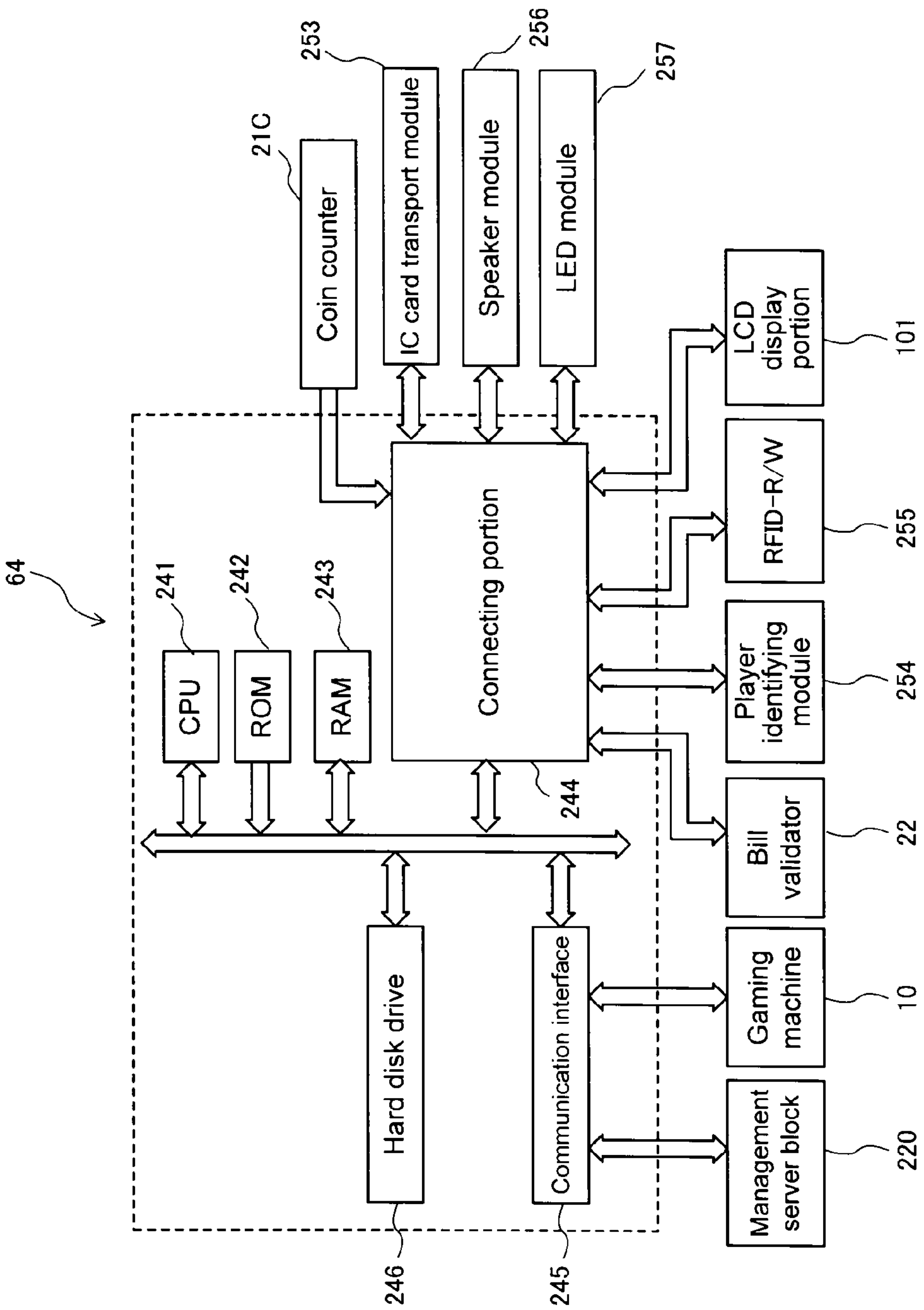
FIG. 11 is a block diagram depicting a configuration of the PTS terminal.

In addition, those provided inside of a PTS terminal 64 are: an IC card R/W (Reader/Writer) for reading data from an IC card and writing data into the IC card (RFID-R/W 255 to be described later in FIG. 11); a card stacker for stocking a plurality of IC cards (FIGS. 8 and 9); an IC card transport module 253 for delivering an IC card among the card slot 102, the IC card R/W; and the card stacker (FIG. 9); a speaker 122 for outputting a voice or an effect sound to the front part of the PTS terminal 64, via the duct 151 (FIG. 8); and a controller for controlling each of the units provided at the PTS terminal 64 (such as CPU 241 shown in FIG. 11).

The IC card transport module 253 (FIG. 9) has a rotor which is rotationally driven by means of a motor. This module is devised so as to lead the IC card inserted into the card slot 102 into an internal predetermined position by means of rotation in the lead-in direction of this roller, and then, eject the IC card from the card slot 102 to the outside by means of rotation in the ejection direction of this roller.

The IC card R/W is for reading data from an IC card by means of the RFID (Radio Frequency Identification) and writing the data into the IC card. The IC card R/W reads, in a non-contact manner, the credit information stored in the IC card inserted through the card slot 102, or alternatively, writing, in a non-contact manner, the credit(s) awarded to a player in accordance with the result of a game.

At a player identifying portion, a camera 111 is provided upward of the LCD display portion 101, and picks up the face of the player seeing the LCD display portion 101 as an image from its front side. The cameras installed so as to be able to pick up the face of the player as an image are not limitative thereto in particular, and can include those such as a CCD camera or a CMOS sensor camera. The microphone 113 is provided upward of the LCD display portion 101, and collects a player's voice from his or her front side. The human body detecting sensor 115 is provided upward of the card slot 102, and detects an activity of a player inserting an IC card into the card slot 102. As the human body detecting sensor 115, an infrared-ray distance measuring sensor or the like can be employed without being limitative thereto in particular. A player identifying portion detects the presence of a player by means of the camera 111, the microphone 113, and the human body detecting sensor 115 as well.

The camera 111 and microphone 113, as their mount position, may be mounted upward of the card slot 102, in place of being mounted upward of the LCD display portion 101, as indicated by the single-dotted chain line in FIG. 4. That is, the camera 112 and a microphone 114 may be provided in place of the camera 111 and the microphone 113. In this way, another unit can be mounted at a position of the LCD display portion 101, without providing the LCD display portion 101. The camera 112 that is provided upward of the card slot 102 has a configuration similar to that of the camera 111, and picks up a player's image from an oblique position. In addition, the microphone 114 that is provided upward of the card slot 102 has a configuration which is similar to that of the microphone 113, and collects the player's voice in an oblique direction.

The LCD display portion 101, the card slot 102, the player identifying portion, the speaker, and the duct 151 are integrally provided on a PTS panel 105. This PTS panel 105 is fixed to the cabinet 11 via a bracket. That is, in the gaming machine 10, a PTS panel 105 integrally provided with the units each configuring the PTS terminal 64, such as the LCD display portion 101, the card slot 102, the player identifying portion, the speakers 122 (FIG. 8), and the duct 151, is fixed by means of a bracket, in a PTS terminal area 100 between the image display panel 16 and the control panel 20.

In addition, the LCD display portion 101, the camera 111, the microphone 113, and the duct 151 are integrally provided on a bezel 106.

As shown in FIG. 4, the PTS terminal 64 allows the LCD display portion 101, the card slot 102, the camera 111 (camera 112), and the microphone 113 (microphone 114) to be integrally provided on the PTS panel 105. The mount positions of these units configuring the PTS terminal 64 are determined by means of mount holes formed on the PTS panel 105.

FIG. 6 is a perspective view showing the PTS panel 105. As shown in FIG. 6, those formed on the PTS panel 105 are: a mount hole 105A for mounting the LCD display portion 101; a mount hole 105B for mounting the card slot 102; a mount hole 105C for mounting the camera 111 and the microphone 113; a mount hole 105D for mounting the human body detecting sensor 115; and a mount hole 105E for mounting the duct 151 for speaker. The corresponding units (LCD display portion 101, card slot 102, camera 111, microphone 113, human body detecting sensor 115, and duct 151 for speaker) are mounted to these mount holes 105A to 105E, whereby these units are positioned and mounted at their predetermined positions.

In FIG. 6, as to the mount hole 105D, it is sufficient if an opening required to mount only the human body detecting sensor 115 is formed in the case where the camera 111 and the microphone 113 are mounted upward of the LCD display portion 101 (i.e., mount hole 105C); and an area indicated by the single-dotted chain line (the area adapted to mount the camera 112 and the microphone 114) is not needed to be opened. However, in consideration of a case of mounting the camera 112 and the microphone 114 upward of the card slot 102, the area indicated by the single-dotted chain line may be opened in advance so as to engage a decorative sheet therein.

Figure 7:
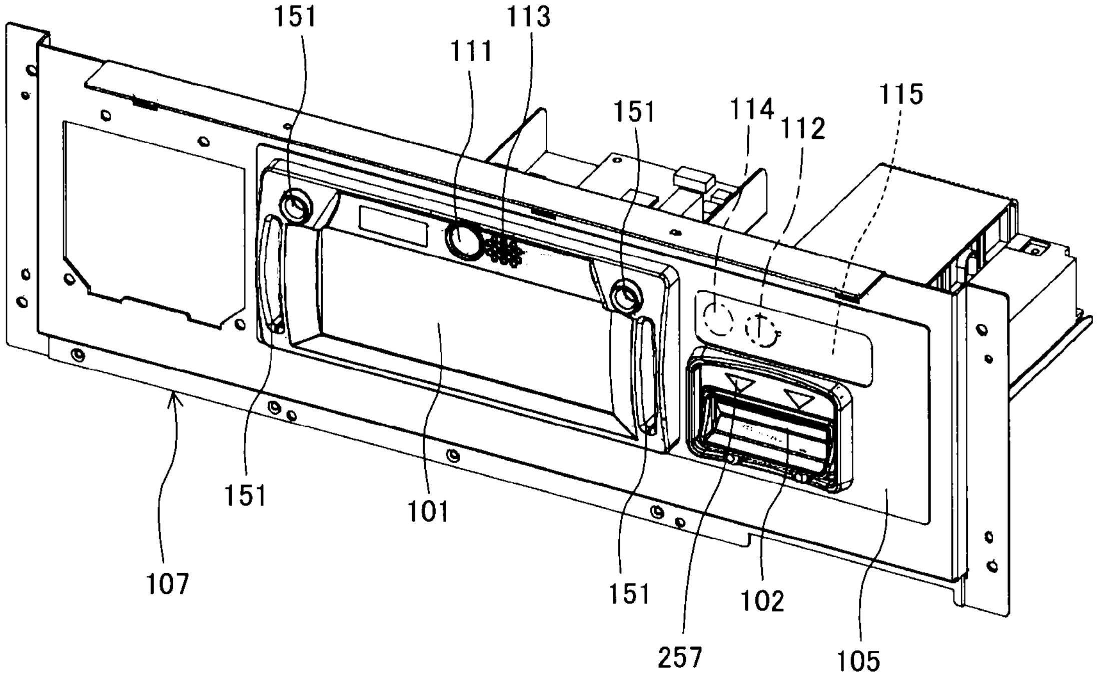
FIG. 7 is a perspective view showing a PTS terminal.

As shown in FIG. 7, the PTS panel 105 is mounted on a plate-like bracket 107, and this bracket 107 is fixed to the cabinet 11 of the gaming machine 10. In FIG. 7 also, the mount positions of the camera 112 and the microphone 114 that are mountable in place of the camera 111 and the microphone 113 are indicated by the single-dotted chain line.

Figure 8:
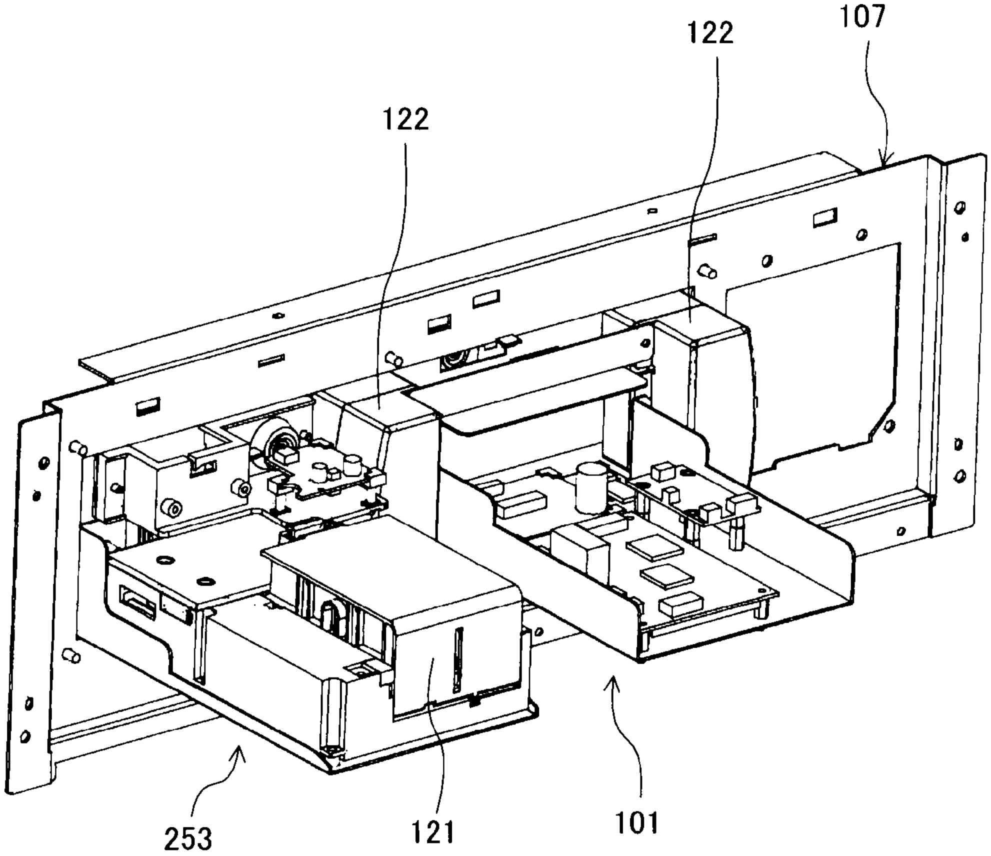
FIG. 8 is a perspective view showing a back side part of the PTS terminal.

FIG. 8 is a perspective view showing a back side of the PTS terminal 64. As shown in FIG. 8, units such as an IC card transport module 253, a card stocker 121, a speaker 122, and an LCD display portion 101 are formed at the back side of the PTS panel 105. These units are integrated with each other by means of the PTS panel 105, and are fixed to the cabinet 11 of the gaming machine 10 via a bracket 107.

Figure 9:
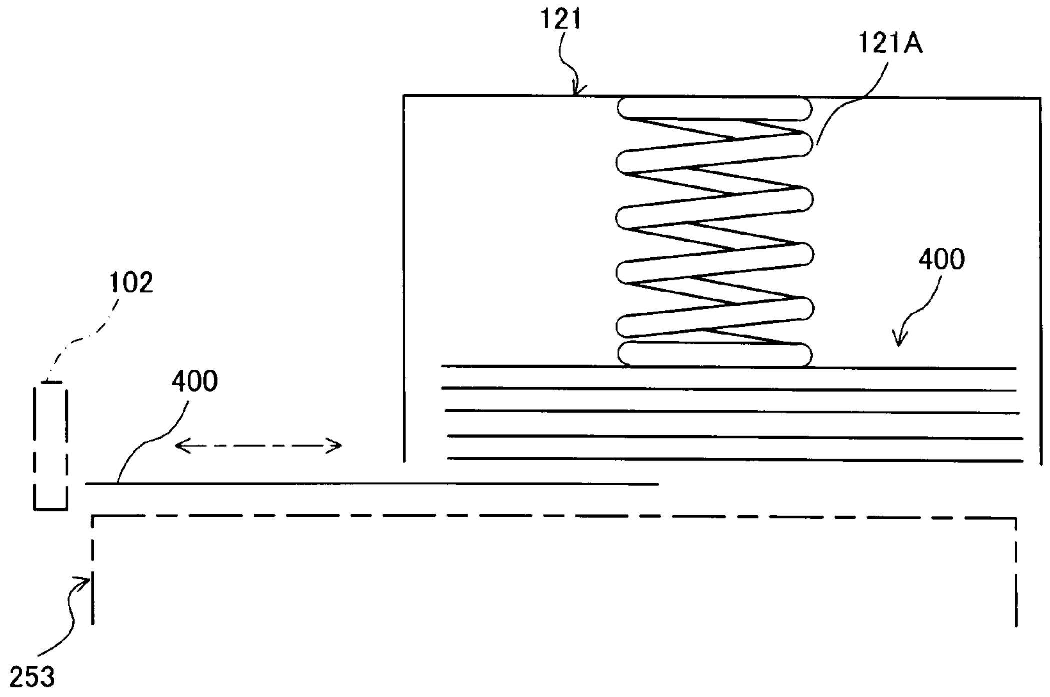
FIG. 9 is a schematic view of a card stacker.

As shown in FIG. 9, the card stacker 121 is configured so that a plurality of IC cards 400 are accommodated to be stacked in a casing whose bottom part is opened. The IC cards in the casing are energized downward by means of a coil spring 121A; the IC card 400 inserted via the card slot 102 is transported up to a predetermined position beneath the casing by means of an IC card transport module 253 comprised of a motor or a rotor; information writing and readout is performed, and if the card becomes unnecessary, it is temporarily kept in the casing.

Figure 10:
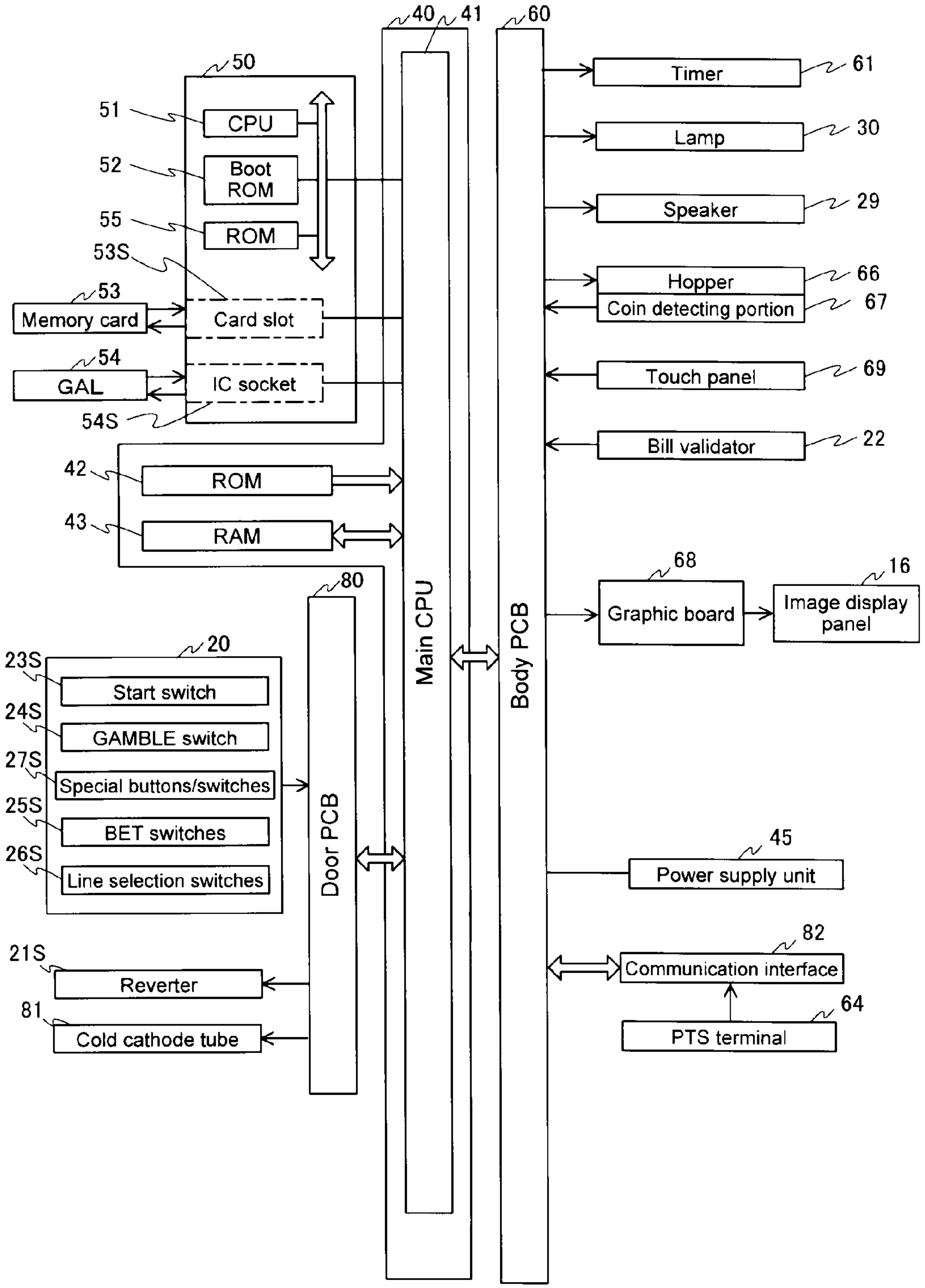
FIG. 10 is a block diagram depicting a configuration of the gaming machine.

FIG. 10 is a block diagram showing an internal configuration of the gaming machine shown in FIG. 4. A gaming board 50 comprises a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 includes a nonvolatile memory such as CompactFlash (registered trade mark), and stores a game program. The game program includes a symbol determination program. The symbol determination program is a program for determining symbols to be rearranged in the display blocks 28. The symbols to be determined by the symbol determination program include 14 types of symbols including “3bar”, “2bar”, “1bar”, “blue7”, “red7”, “white7”, “RIBBON”, “HEART”, “STAR”, “MOON”, “SUN”, “JEWEL”, “CROWN”, and “SMILE”.

Further, the card slot 53S is configured so as to allow the memory card 53 to be inserted thereinto or removed therefrom, and is connected to the mother board 40 by an IDE bus. Therefore, the type and contents of a game played on the gaming machine 10 can be changed by removing the memory card 53 from the card slot 53S, writing another game program into the memory card 53, and inserting the memory card 53 into the card slot 53S. The game program includes a program on the progress of the game. Further, the game program includes image data and sound data to be outputted during the game.

The CPU 51, the ROM 55 and the boot ROM 52 interconnected to one another by an internal bus are connected to the mother board 40 through a PCI bus. The PCI bus not only conducts signal transmission between the mother board 40 and the gaming board 50, but also supplies power from the mother board 40 to the gaming board 50.

The mother board 40 is configured using a commercially available general-purpose mother board (a print wiring board on which fundamental components of a personal computer are mounted), and provided with a main CPU 41, a ROM (Read Only Memory) 42, a RAM (Random Access Memory) 43, and a communication interface 44.

The ROM 42 stores a program such as a BIOS (Basic Input/Output System) which comprises a memory device such as a flash memory and is executed by the main CPU 41, and permanent data. When the BIOS is executed by the main CPU 41, processing for initializing a predetermined peripheral device is conducted, concurrently with start of processing for loading the game program stored in the memory card 53 via the gaming board 50. It is to be noted that, in the present invention, the ROM 42 may or may not be data rewritable one.

The ROM 42 includes: data indicative of a predetermined time T; odds data indicative of correspondence relationships between combinations of symbols rearranged along the winning line and the numbers of payouts; data indicative of a first constant number; data indicative of a second constant number; and the like.

The RAM 43 stores data and a program to be used at the time of operation of the main CPU 41. Further, the RAM 43 is capable of storing a game program.

Moreover, the RAM 43 stores data concerning the number of credits, the numbers of coin-ins and coin-outs in one game, and the like.

Moreover, the mother board 40 is connected with a later-described body PCB (Printed Circuit Board) 60 and a door PCB 80 through respective USBs. Further, the mother board 40 is connected with a power supply unit 45 and the communication interface 44. The communication interface 44 is connected with a communication interface 245 of the PTS terminal 64 through a communication line.

The body PCB 60 and the door PCB 80 are connected with an instrument and a device that generate an input signal to be inputted into the main CPU 41 and an instrument and a device, operations of which are controlled by a control signal outputted from the main CPU 41. The main CPU 41 executes the game program stored in the RAM 43 based on the input signal inputted into the main CPU 41, and thereby executes the predetermined arithmetic processing, stores the result thereof into the RAM 43, or transmits a control signal to each instrument and device as processing for controlling each instrument and device.

The body PCB 60 is connected with a lamp 30, a hopper 66, a coin detecting portion 67, a graphic board 68, the speaker 29, the touch panel 69, and a timer 61.

The hopper 66 is installed inside the cabinet 11, and pays out a predetermined number of coins based on the control signal outputted from the main CPU 41, from a coin payout exit to the coin tray 18. The coin detecting portion 67 is provided inside the coin payout exit that is provided in a coin tray 18 (FIG. 4), and outputs an input signal to the main CPU 41 in the case of detecting payout of the predetermined number of coins from the coin payout exit. The timer 37 is used for measuring the time.

The graphic board 68 controls image display on the image display panel 16, based on the control signal outputted from the main CPU 41. In the respective display blocks 28 on the image display panel 16, symbols are displayed in a scrolling manner or in a stopped state. The number of credits stored in the RAM 43 is displayed to the number-of-credits display portion 31 of the image display panel 16. Further, the number of coin-outs is displayed to the number-of-payouts display portion 32 of the image display panel 16. The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

A control panel 20, a reverter 21S, and a cold cathode tube 81 are connected to a door PCB 80. On the control panel 20, there are provided: a start switch 23S corresponding to the start button 23; a GAMBLE switch 24S corresponding to the GAMBLE button 24; BET switches 25S corresponding to the BET buttons (1-BET buttons 25A to 10-BET buttons 25E); line selection switches 26S corresponding to the line selection buttons (2-line selection button 26A to 50-line selection button 26E); and special buttons/switches 27S corresponding to special buttons (RESERVE button 27A, TAKE WIN/COLLECT button 27B, GAME RULES button 27C). The switches 23S to 27S each output an input signal to a main CPU 41 when the corresponding buttons 23 to 27 each are operated by a player.

The reverter 21S operates based on the control signal outputted from the main CPU 41, and distributes a coin into a cash box (not shown) or the hopper 66, which are disposed in the gaming machine 10. Namely, when the hopper 66 is filled with coins, a regular coin is distributed into the cash box by the reverter 21S. On the other hand, when the hopper 66 is not filled with coins, the regular coin is distributed into the hopper 66. The cold cathode tube 81 functions as a back light installed on the rear side of the image display panel 16, and lighted up based on the control signal outputted from the main CPU 41.

FIG. 11 is a block diagram illustrating an internal configuration of a PTS terminal 64 incorporated in the gaming machine 10, according to the embodiment of the present invention. The PTS terminal 64 includes a CPU 241, a ROM 242, a RAM 243, a connecting portion 244, the communication interface 245, and a hard disk drive 246. The CPU 241, the ROM 242, and the RAM 243 configure a controller of the PTS terminal 64. The communication interface 245 is connected to the communication interface 44 of a gaming machine 10 having the PTS terminal 64 incorporated therein, through a communication line, and is also connected to the management server block 220 through a communication line. The ROM 242 stores: a system program for controlling operations of the PTS terminal 64; exchange-fee calculated value data; permanent data; and the like. The exchange-fee calculated value data is data indicating the exchange-fee calculated value $P/(1-P)$ (where P is an exchange fee ratio). Further, the RAM 243 temporarily stores exchange rate data indicating an exchange rate in which a correspondence relationship between the amount of the basic currency (U.S. currency) and the amount of another type of currency other than the basic currency is set for each type of currency other than the basic currency, and the like.

The hard disk drive 246 functions to store an image data concerning an image captured by the camera 111 (camera 112) controlled by means of a player identifying module 254. The hard disk drive 246 corresponds to the memory in the present invention. The CPU 241 stores, after power is supplied thereto and a predetermined activation processing is performed thereto, the image data obtained upon image-capturing by the camera 111 (camera 112), in the hard disk drive 246. The storage of the image data is performed at a predetermined time interval (for example, 0.5 second interval). Each of the image data is marked with a time (time stamp) at which the image data is stored in the hard disk drive 246. The PTS terminal 64 has a clock function and conducts time correction each time a predetermined time period elapses. The time correction is conducted by obtaining time data from a clock installed in the management server block 220 or from outside via the Internet. When the storable domain of the hard disk drive 246 becomes less than a predetermined amount (for example, 100 MB), the CPU 241 deletes the image data from those marked with an older time stamp. It is to be noted that the image data that are not set to the deletable state are not deleted.

The connecting portion 244 is connected to the bill validator 22, a coin counter 21C, a player identifying module 254, a Radio Frequency Identification reader/writer 255(hereinafter also referred to as RFID-R 255/W255), an LCD display portion 101, an IC card transport module 253, a speaker module 256, and an LED module 257 respective communication lines.

The bill validator 22 not only discriminates a regular bill (basic currency) from a false bill, but also accepts the regular bill. When having accepted a regular bill, the bill validator 22 outputs an input signal to the CPU 241, based on the face amount of the bill. That is, an input signal includes information about the amount of the accepted bill. The bill validator 22 identifies the types of bills of a plurality of countries which are currencies other than the basic currency and discriminates a regular bill from a false bill, and accepts the regular bill. When having accepted the regular bill, the bill validator 22 outputs an input signal to the CPU 241, based on the type and the amount of the bill. An input signal includes type-of-currency data indicating the identified type of the currency and amount-of-currency data indicating the amount of this currency. That is, an input signal includes information about the type and the amount of the accepted bill.

The coin counter 21C is provided inside the coin receiving slot 21, and discriminates a regular coin from a false coin inserted into the coin receiving slot 21 by the player. Coins other than the regular coin are discharged from the coin payout exit. Further, the coin counter 21C outputs an input signal to the CPU 241 in detection of the regular coin.

The player identifying module 254 controls operation of the microphone 113 (microphone 114). The voice data obtained by collecting voice(s) is stored in a hard disk drive 246 of the PTS terminal 64. In addition, the player identifying module 254 controls operation of the camera 111 (camera 112). The obtained, picked up image data is stored in the hard disk drive 246 of the PTS terminal 64. Further, the player identifying module 254 controls operation of the human body detecting sensor 115. The detected result is stored in the hard disk drive 246 of the PTS terminal 64.

The RFID-R/W 255 reads credit information, in a non-contact manner, from the IC card inserted into the card slot 102 (FIG. 4); and writes, into the IC card, the credit information corresponding to the number of coins responsive to a payment having taken place in accordance with the result of a game.

The IC card transport module 253 has a sensor (such as optical sensor) for detecting an IC card inserted through the card slot 102; and a motor for transporting the IC card to a predetermined position. When the IC card is inserted through the card slot 102, the insertion state is detected by the sensor, and a motor is driven to draw the inserted IC card into a predetermined position. In addition, in the case where the TAKE WIN/COLLECT button 27B (FIG. 5) is operated by a player in a predetermined manner, and then, credit information is written into the IC card, the IC card transport module 253 ejects the IC card having the credit information written therein, from the card slot to the outside, by inversely rotating the motor.

The LCD display portion 101 displays the information received from the management server block 220 via a communication interface 245.

The speaker module 256 outputs a voice or an effect sound from a speaker 122 (FIG. 8) of the PTS terminal 64 in the case of detecting that an IC card has been inserted into the card slot 102 or in the case of receiving information from the management server block 220 and displaying the received information on the LCD display portion 101, for example.

The LED module 257 emits light with a color responsive to the remaining number of IC cards remaining on a stacker 121 (FIG. 8). This LED module 257 is provided proximal (upward) of the card slot 102 (FIG. 4), whereby, in a normal display state in which the remaining number of IC cards is not displayed, the module is employed as a mark representative of the position of the card slot 102; and if an IC card is left, the module is devised to clearly indicate the fact by means of a special light emitting mode such as blinking.

Figure 12:
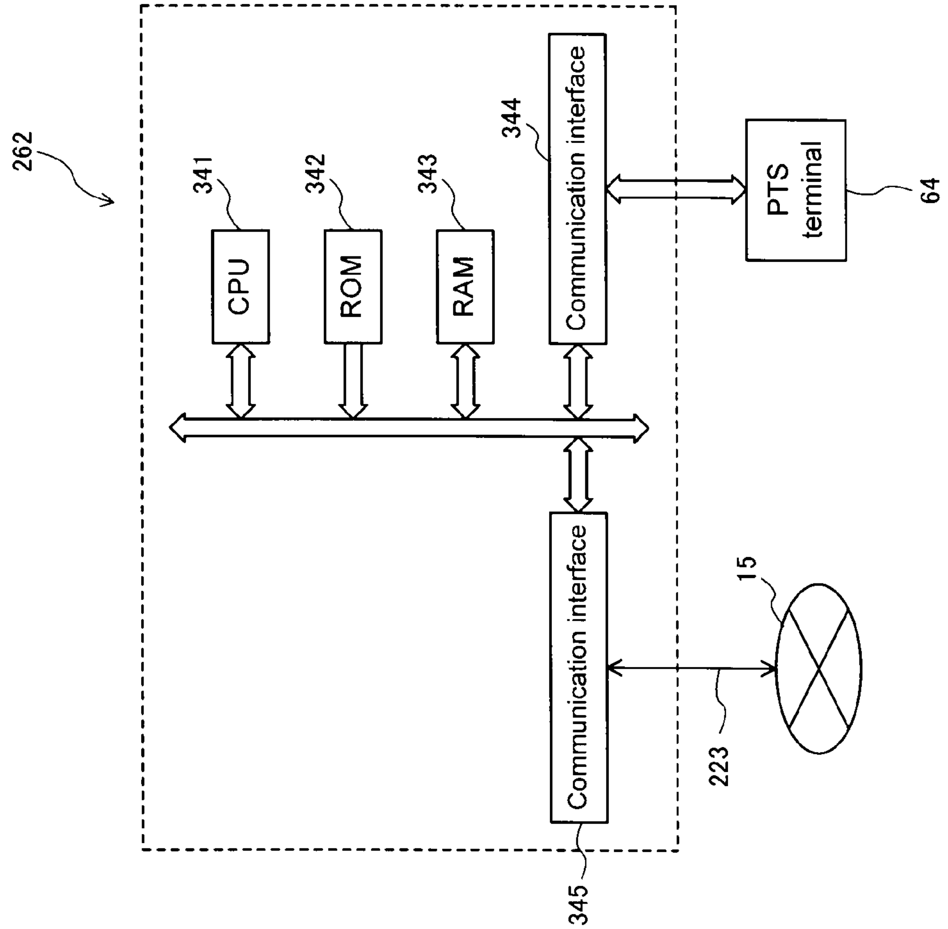
FIG. 12 is a block diagram depicting a configuration of an exchange server.

FIG. 12 is a block diagram illustrating an internal configuration of an exchange server forming the gaming system according to the embodiment. The exchange server 262 includes a CPU 341, a ROM 342, a RAM 343, a communication interface 344, and a communication interface 345. The communication interface 344 is connected to the communication interface 245 of the PTS terminal 64 through a communication line. The communication interface 345 is connected to the Internet 15 through the communication line 223. The ROM 342 stores; a system program for controlling operations of the exchange server 262; an exchange information acquisition program for acquiring the latest exchange information via the Internet 15; permanent data; fee data indicating the exchange fee ratio P; and the like. Further, the RAM 343 temporarily stores exchange information, exchange information of post-fee-subtraction, and the like.

Figure 13:
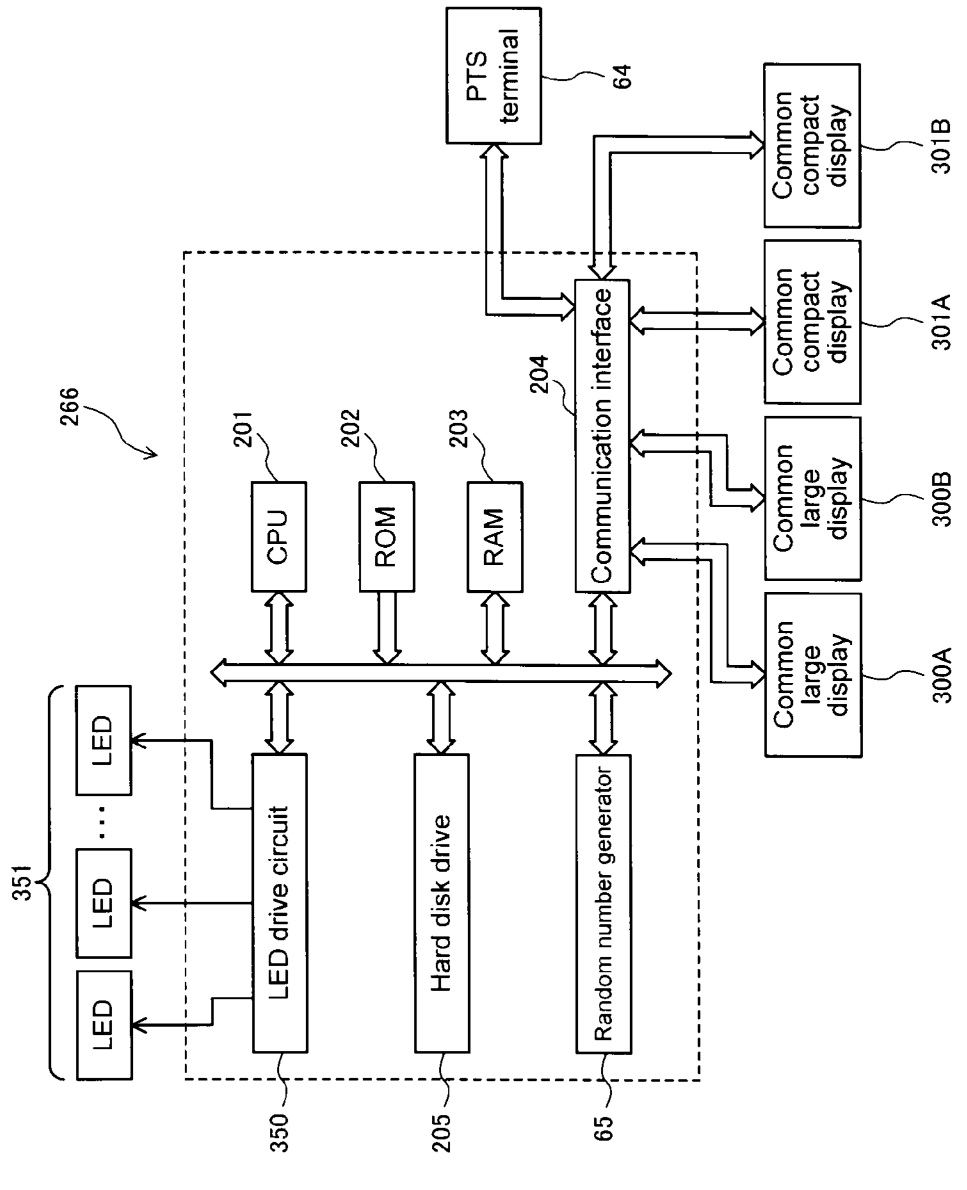
FIG. 13 is a block diagram depicting a configuration of a megabucks server.

FIG. 13 is a block diagram illustrating an internal configuration of a megabucks server forming the gaming system according to the embodiment. The megabucks server 266 includes a CPU 201, a ROM 202, a RAM 203, a communication interface 204, a LED drive circuit 350, a random number generator 65, and a hard disk drive 205 as a memory. The random number generator 65 generates a random number at a predetermined timing. The communication interface 204 is connected through communication lines to the communication interfaces 245 of the PTS terminals 64, and also is connected to a common large display 300A which is installed in casino facility or the like, a common large display 300B, a common compact display 301A, and a common compact display 301B through communication lines. The ROM 202 stores a system program for controlling the operation of the megabucks server 266, permanent data, and the like. Further, the RAM 203 temporarily stores cumulative-value data for EVENT TIME indicative of the cumulative value for EVENT TIME, cumulative-value data for bonus indicative of the cumulative value for bonus, number-of-lights data indicative of the number of the LEDs 351 having been lighted among the LEDs 351 included in the coupling illumination band provided for each of the gaming machines 10, data received from each of the gaming machines 10, and the like.

In the hard disk drive 205, number-of-lighting determination table data indicative of a plurality of types of number-of-lighting determination tables (a number-of-lighting determination table for bent portions and a number-of-lighting determination table for straight portions) is stored.

Further, in the hard disk drive 205, number-of-points determination table data to be referred to in determining the number of points in the common game is stored. Furthermore, in the hard disk drive 205, data indicative of the predetermined value and data indicative of the specific value are stored.

The plurality of LEDs 351 are connected to the LED drive circuit 350. The LEDs 351 are associated with respective identification numbers, and the LED drive circuit 350 turns on and turns off the LEDs 351 based on a signal received from the CPU 201.

Figure 14:
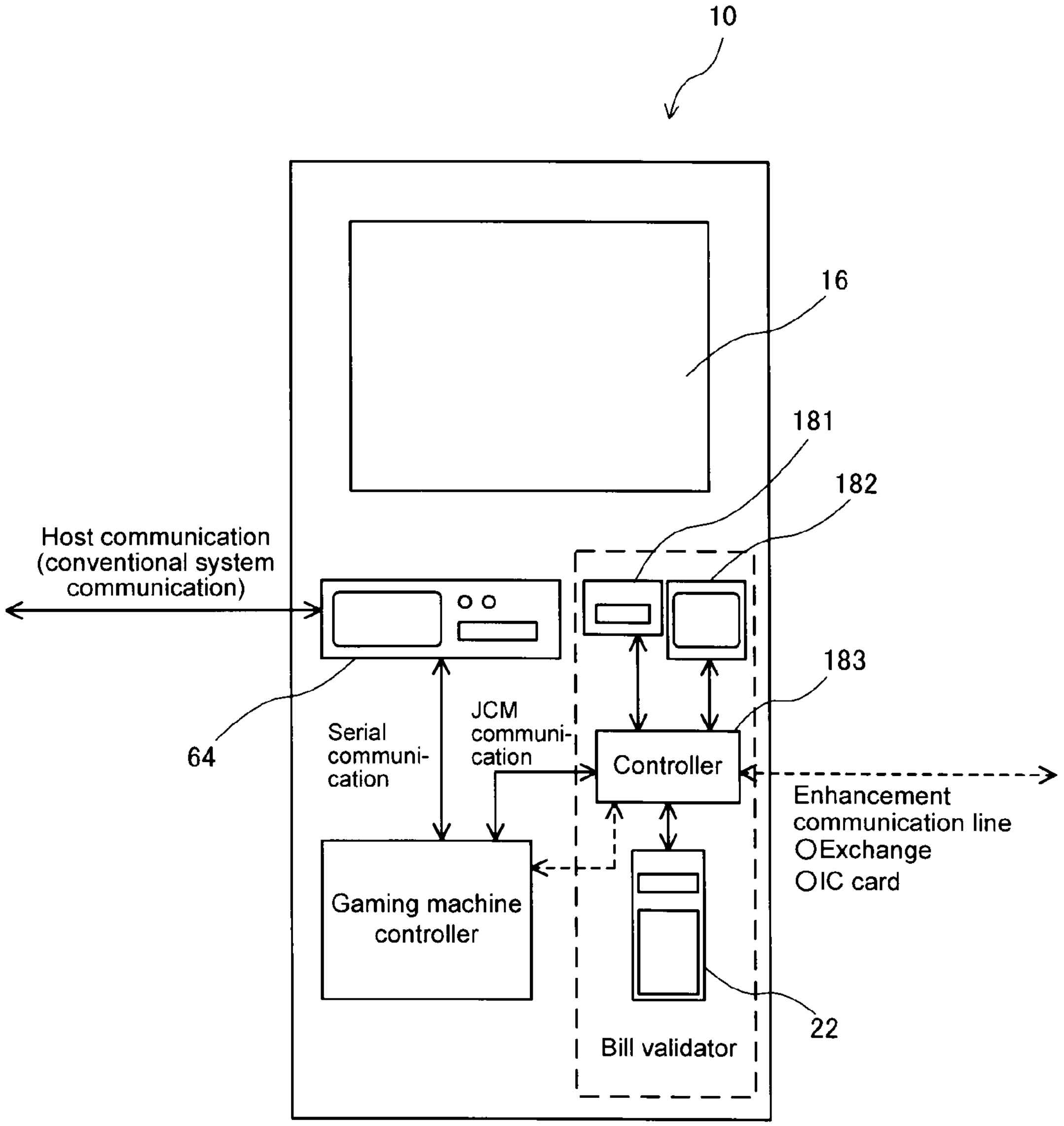
FIG. 14 is a schematic view of a communication connection state of the PTS terminal.

FIG. 14 is a conceptual view showing an example of the configuration in the case where a PTS terminal 64 and a money exchange unit (IC card R/W 181, LCD display portion 182, controller 183) are added to the gaming machine 10 separately. In the configuration shown in FIG. 14, a player is authenticated, and thereafter, a money exchange function is made available by inserting a player-specific IC card having identification information for identifying a player written therein into the IC card R/W 181. In this case, a bill validator line of the gaming machine 10 is bypassed, and with respect to money exchange, a controller 183 performs communication with the bill validator or management server block 220 (FIG. 1). The controller 183 transfers a money exchange result to a gaming machine controller (motherboard 40 of the gaming machine 10) (FIG. 10).

Figure 15:
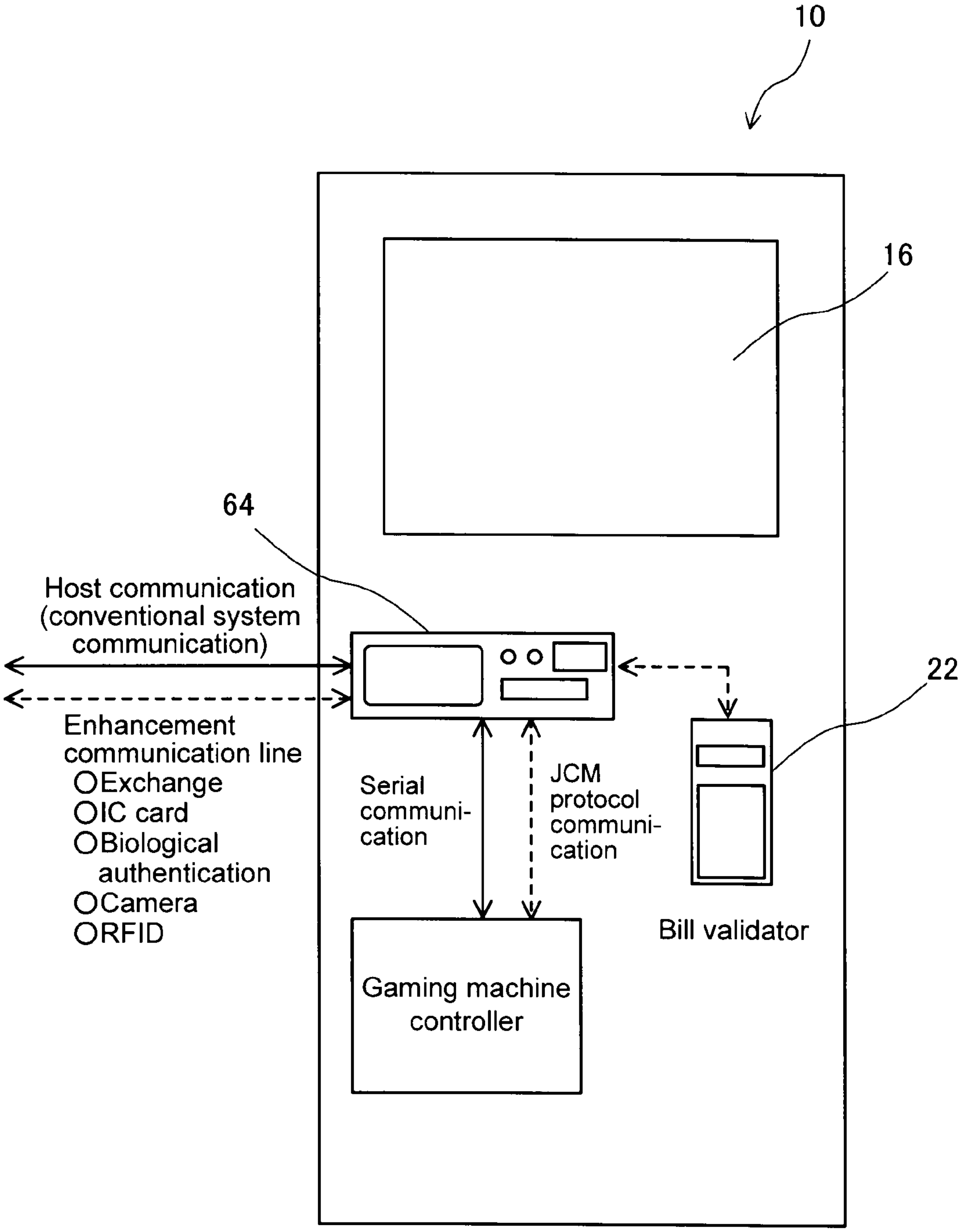
FIG. 15 is a schematic view of a communication connection state of the PTS terminal.

FIG. 15 is a conceptual view showing a configuration of integrating a money exchange function with the PTS terminal 64. In this case, at the PTS terminal 64, a player identifying portion (camera 111 (camera 112), microphone 113 (microphone 114), and human body detecting sensor 115 (FIG. 4)) is provided to identify a player. At the PTS terminal 64, by having a conventional system communication, information relating to authentication or information related to money exchange can be added by means of a communication line as an additional function or by means of a leased line with compatibility with the existing system being maintained. Further, in the gaming machine 10 with which the PTS terminal 64 shown in FIG. 15 has been integrated, a variety of information can be downloaded from a management server block 220 (FIG. 1), and services such as megabucks, image recording, and individual rescues for individual players in games can be provided by means of communication with the management server block 220.

Figure 16:
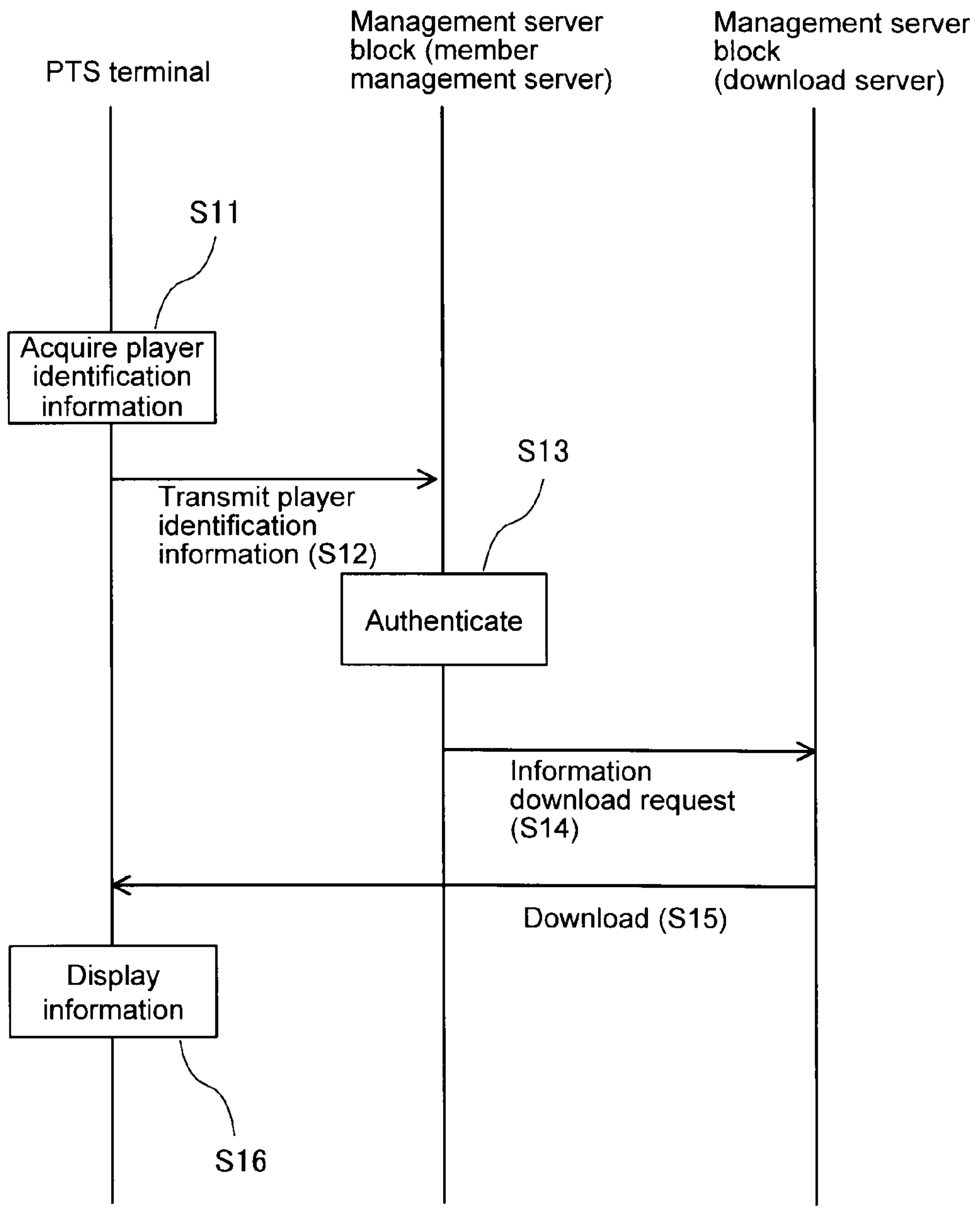
FIG. 16 is a timing chart showing a procedure for processing operation of the PTS terminal and a management server block.

For example, as shown in FIG. 16, at the PTS terminal 64, player identification information such as images or voices is acquired at a player identifying portion (camera 111), a camera 112), a microphone 113 (microphone 114), or a human body detecting sensor 115 (FIG. 4)) (step S11), and this information is transmitted to a member management server 264 of the management server block 220 (step S12). In the member management server 264, a player is identified based on the received player identification information, and authentication is performed based on the identification result (step S13). When the authentication result indicates a registered member, a download request is transmitted from the member management server 264, for instance, to the download server 263 together with information for specifying the PTS terminal 64 (step S14). In this manner, from the download server 263, specific service information is downloaded to the PTS 64 of the gaming machine 10 played by the player (step S15). For example, in the case where this player fall into a player registered in the member management server 264 (FIG. 4) of the management server block 220 in advance, significant information (such as information related to product sale or information related to theatrical performance to be played at theater) on the PTS server 263 transmitted the information on the player is downloaded from the member management server 264 to the download server. This information is displayed at the LCD display portion 101 of the PTS terminal 64 (step S16).

As just described, in the gaming machine 10, the PTS terminal 64 is integrally provided, and at this PTS terminal 64, in a posture in which a player plays a game in the gaming machine 10, the LCD display portion 101 is provided at a front side at which the player can be easily seen. In addition, in a state in which the posture of this player is kept, the camera 111 (camera 112) for picking up an image of the player's front or oblique face is provided at the PTS terminal 64. Moreover, a microphone 113 (microphone 114) for collecting the player's voice in the posture of this player is provided at the PTS terminal 64. Further, the human body detecting sensor 115 for detecting a player in the posture of this player is provided as a player identifying portion.

This player identifying portion, the LCD display portion 101, and the card slot 102 are positioned at their specific positions by means of a PTS panel 105 (FIG. 6) provided at the PTS terminal 64. This position, as described above, is caused to correspond to a natural posture to be taken when a player plays a game in the gaming machine 10. A player can be reliably recognized by integrating the PTS terminal 64 that has been fixed in such a positional relationship, with the gaming machine 10.

In addition, since the PTS terminal 64 needs to be set up at a limited position which is a PTS terminal area 100 (FIG. 4) of the gaming machine 10, a speaker 122 (FIG. 8) of the PTS terminal 64 is provided at the back side of the LCD display portion 101. An effect sound or the like from this speaker 122 is output to the front side from a duct 151 opening at the front side of the LCD display portion 101. In this manner, the PTS terminal 64 can be downsized more remarkably, and accordingly, the speaker 122 can be provided at the back side, and further, the PTS terminal 64 can be disposed in the limited PTS terminal area 100.

Next, an operating procedure using a controller (CPU 241, ROM 242, RAM 243) of the PTS terminal 64 will be described.

Figure 17:
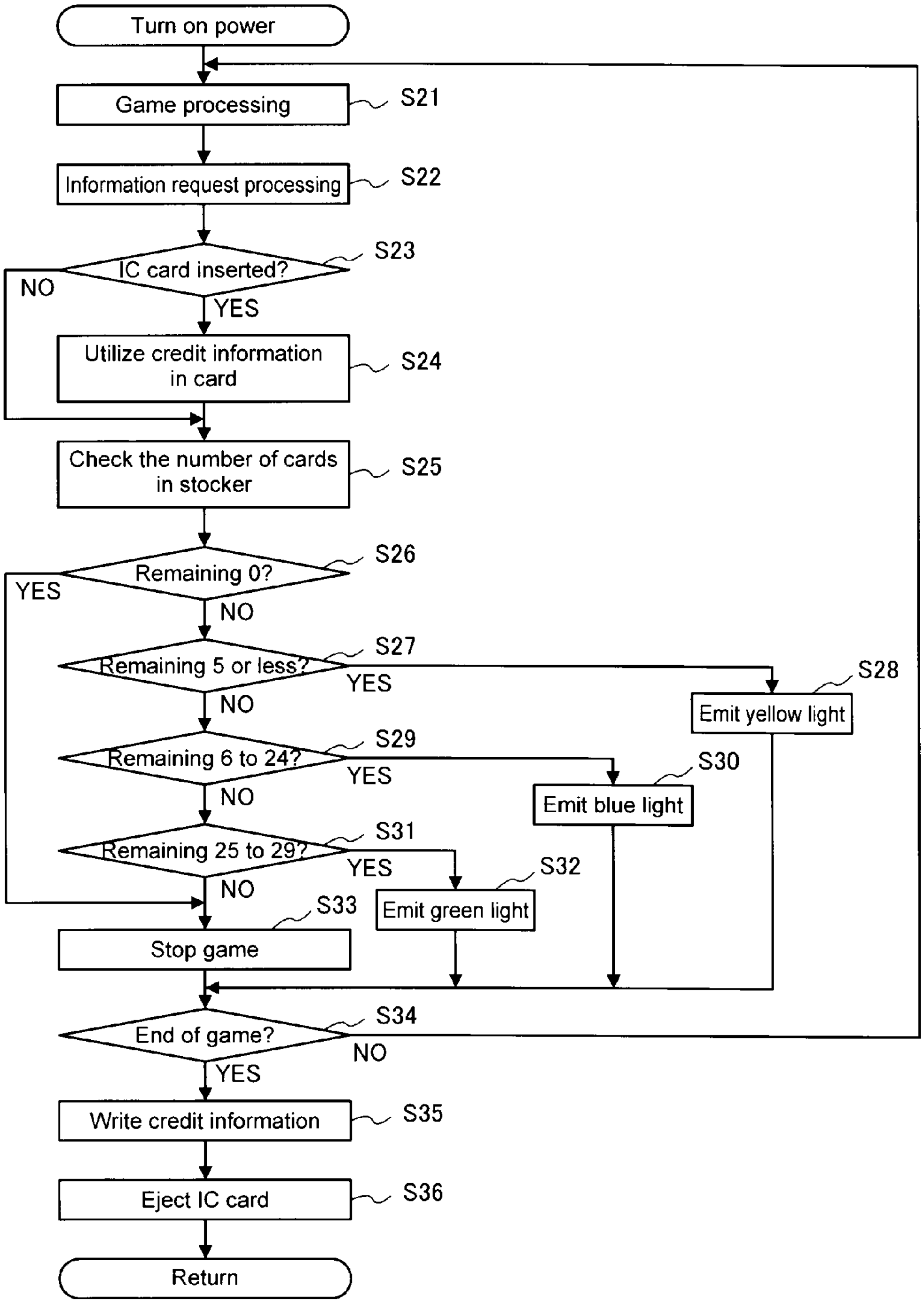
FIG. 17 is a flowchart showing a procedure for processing operation at the PTS terminal.

FIG. 17 is a flowchart showing an operating procedure using the controller of the PTS terminal 64. As shown in FIG. 17, when the PTS terminal 64 (gaming machine 10) is powered on, game processing of the gaming machine 10 is executed in step S21. Subsequently, while in this game, the controller of the PTS terminal 64 executes information request processing in step S22. This request processing is processing of: acquiring identification information of a player by means of the player identifying portion (camera 111 (camera 112), microphone 113 (microphone 112), human body detecting sensor 115) that is provided at the PTS terminal; and based on this identification information, providing specific service information for the player from the management server block 220.

In this processing, the controller acquires a facial image for identifying a player by picking up the face of the player as an image from a front side (oblique side) by means of the camera 111 (camera 112) that is one of the player identifying portions. Data concerning this facial image is stored in a hard disk drive 246 of the PTS terminal 64. In addition, the controller collects the player's voice from the front side (oblique side) by means of the microphone 113 (microphone 114) which is one of the player identifying portions. In this case, the controller can reliably acquire the player's voice by providing a display promoting the LCD display portion 101 to generate the voice. This voice data is stored in the hard disk drive 246 of the PTS terminal 64.

The above-described processing in step S22 is the one that corresponds to the processing of acquiring the player identification information (step S11) shown in FIG. 16. As described above with respect to FIG. 16, the controller transmits the thus acquired information to the management server 220 (FIG. 1), whereby the transmitted information is authenticated by means of the member management server 264 of the management server block 220, and if it is determined that the authenticated information is a regularly registered player, significant information for the player is downloaded from the download sever 263 or the like to the PTS terminal 64. This information is displayed at the LCD display portion 101.

Subsequent to information request processing, the controller causes the routine to migrate to step S23, and then, determines whether or not an IC card has been inserted into a card slot 102 of the PTS terminal 64 (FIG. 4). The insertion of the IC card is detected by means of a sensor which is provided in the card slot 102. As this sensor, for example, there can be employed the one that is capable of detecting the fact that a shutter is moved by means of an IC card, or alternatively, an optical sensor and the like.

If an affirmative result is obtained in step S23, the fact means that an IC card has been inserted, and the controller causes the routine to migrate from step S23 to step S24, and then, utilizes the credit information written in a card for a game. That is, this credit information is stored in a RAM 43 of the gaming machine 10 so as to be made available for a game and the fact is displayed at the number-of-credits display section 31 of the image display portion 16 of the gaming machine 10.

Subsequent to the processing of step S24, or alternatively, if a negative result is obtained in step S23, the controller causes the routine to migrate to step S25, and then, checks the number of IC cards stocked in a stocker 121 (FIG. 8). Identification information specific to each of the stocked IC card is read by means of the RFID-R/W 255 (FIG. 11) that is connected to the PTS 64, whereby the number of stocked IC cards can be recognized. A method of detecting the number of stocks is not limitative thereto, and the number of stocks can also be detected by employing an optical sensor or the like, for example.

Upon the completion of check in step S25, the controller causes the routine to migrate to step S26, and determines whether or not the remaining number of stocks detected in step S25 becomes 0. In the case where the remaining number becomes 0, the controller causes the routine to migrate from step S26 to step S33, and then, stops a game. This makes it possible to avoid a circumstance that the result of a game to be written into the IC card is obtained with no IC card.

On the other hand, if a negative result is obtained in step S26, the fact means that the number of stocks is 1 or more, and the controller causes the routine to migrate from step S26 to step S27, and then, determines whether or not the remaining number of stocks is 1 to 5. If an affirmative result is obtained, the fact means that the remaining number of stocks is 1 to 5, and the controller causes the routine to migrate from step S27 to step S28, and causes an LED to emit yellow light. In this manner, the fact that the remaining number of stocked IC cards is becoming few can be notified to the staff in casino facility. The modes of emitting light in according with the remaining number of IC cards are stored in the RAM 243 (FIG. 11) as a table as shown in FIG. 18.

On the other hand, if a negative result is obtained in step S27, the fact means that the number of stocks is not 5 or less, and the controller causes the routine to migrate from step S27 to step S29, and determines whether or not the remaining number of stocks is 6 to 24. If an affirmative result is obtained, the fact means that the remaining number of stocks is 6 to 24, and the controller causes the routine to migrate from step S29 to step S30, and then, causes the LED to emit blue light. In this manner, the fact that the number of stocked IC cards still remains in a sufficient range can be notified to the staff in casino facility.

On the other hand, if a negative result is obtained in step S29, the fact means that the remaining number of stocks is not 6 to 24 (that is, that the remaining number is not 24 or less), the controller causes the routine to migrate from step S29 to step S31, and then, determines whether or not the remaining number of stocks is 25 to 29. If an affirmative result is obtained, the fact means that the remaining number is 25 to 29, and the controller causes the routine to migrate from step S31 to step S32, and causes the LED to emit green light. In this manner, the fact that the number of stocked IC cards is approaching a full state can be notified to the staff in casino facility.

On the other hand, if a negative result is obtained in step S31, the fact means that the number of stocks is 30 (full), and the controller causes the routine to migrate from step S31 to step S33, and then, stops a game. This makes it possible to avoid a circumstance that: the number of stocked IC cards is full; and an IC card is inserted into the card slot 102 by a further new player.

Subsequent to the processing of step S28, step S30, step S32, or step S33, the controller causes the routine to migrate to step S34, and determines whether or not a game of the gaming machine 10 has completed, and if the game has not terminated, the routine reverts to the abovementioned step S21, and the similar processing is repeated.

On the other hand, in the case where the game has completed, the controller causes the routine from step S34 to step S35, and then, writes a payment having taken place as the result of a game as credit information into an IC card inserted through the card slot 102 by a player at this time, or alternatively, the IC card stocked in the card stocker 121 if no IC card is inserted by a player.

In subsequent step S36, the controller ejects the IC card having credit information written therein from the card slot 102 by controlling an IC card transport module 253 (FIG. 11). In this ejection processing, in the case where a player has attempted to leave his or her seat, based on an identification result of the player identifying portion, the LED light emitting module 257 causes the LED to emit light with its specific light emitting mode (such as blinking), allowing the player to be warned of the fact. The LED may be caused to always emit light in its specific mode, if an IC card is ejected regardless of the identification result obtained by the player identifying portion. In addition, if a player has not been detected within a predetermined period of time, based on a detection result of the human body detecting sensor 115 or the like, it is possible to prevent a person other than an authorized player to take an IC card away from there by stopping ejection of the IC card (by drawing back the IC card).

By means of the above-described operating procedure, at the PTS terminal 64, significant information for the player who is playing a game in the gaming machine 10 at this time can be provided from the management server block 220 (FIG. 1), and in accordance with the remaining number of IC cards stocked in the card stocker 121 (FIG. 8) of the IC cards, the remaining number of stocked IC cards can be displayed in an easily understandable manner from the outside of the PTS terminal 64 (gaming machine 10) by causing the LED (LED module 257), which is provided in the vicinity of the card slot 102 (FIG. 4), to emit light. Thus, the staff in casino facility can easily and reliably keep track of the number of IC cards remaining on the card stocker 121 without a need to open and check the inside of the gaming machine 10.

As has been described above, in the gaming machine 10 having the PTS terminal 64 incorporated therein, of the embodiment, units such as the camera 111 (camera 112), the microphone 113 (microphone 114), the human body detecting sensor 115, the LCD display portion 101, and the card slot 102, which acquire information for identifying a player, are integrally provided at their predetermined positions, respectively, whereby the player can be identified with sufficient precision, according to a positional relationship of these integrated units.

That is, when a player takes a seat against the front side of the gaming machine 10, the player faces to the PTS terminal 64 that is provided downward of the image display portion 16 (FIG. 4) of the gaming machine 10. In this state, the LCD display portion 101 that is provided at the front center part of the PTS terminal 64 is positioned at the front side of the player. In this manner, the player can see the LCD display portion 101 without a need to vary the posture of the player playing a game in the gaming machine 10.

The camera 111 and the microphone 113 are provided upward of the LCD display portion 101, allowing the face of the player, who is playing a game in the gaming machine 10, to be picked up as an image from the front side and the player's voice to be collected from the front side.

In addition, the card slot 102 is provided rightward of the LCD display portion 101. In this manner, the player can insert/remove an IC card into/from the card slot 102 by his or her right hand without a need to vary the posture of the player playing a game in the gaming machine 10. In the case where the camera 113 and the microphone 114 are provided upward of the card slot 102, the face of the player who is playing a game in the gaming machine 10 can be picked up as an image from its oblique side and the player's voice can be collected from the oblique side.

These items of information are compared with data concerning the players registered in advance in the member management server 264 of the management server block 220.

At the PTS terminal 64, each of the units of the PTS terminal 64, which is set up at a predetermined angle, is reliably mounted at a predetermined position by means of a PTS panel 105 (FIG. 6), thereby making it possible to prevent a player authentication error coming from an error related to the mount position of the units for identifying a player, such as cameras or microphones. In addition, the PTS terminal 64 is provided between an image display panel 16 (FIG. 4) for displaying a game and a control panel 20, thereby allowing the image (face) of the player, who is playing a game in the gaming machine 10, to be naturally determined at a position at which the image is picked up by means of the camera 111 (112) in the posture of the player playing a game. In addition, a positional relationship between the camera 111 (112) and the LCD display portion 101 is fixed at the PTS terminal 64, thereby allowing the image (face) of the player, who sees the information displayed at the LCD display portion 101, to be naturally determined at a position at which the image is picked up by means of the camera 111 (112). Accordingly, a person who attempts to take illegal act against the gaming machine 10, for example, is picked up as an image by means of the camera 111 (112) in the posture of the player playing a game in the gaming machine 10 (the posture of seeing the LCD display portion 101 of the PTS terminal 64). In this manner, the person who has taken illegal act can be specified and an effect of restraining illegal act can also be anticipated. In addition, where the player is a regular customer, based on the player identification result obtained by means of the camera 111 (112) or the microphone 113 (114), for example, there can be provided a variety of services such as awarding predetermined credit(s) by means of default setting(s). Further, in a partial area of the LCD display portion 101, in the case of superimposing the player's image picked up as an image by means of the camera 111 (112) as well, the face of the player can be appropriately picked up as an image at a natural posture of the player playing a game in the gaming machine 10 without a need for the player to take a complicated action such as aligning the facial position so that his or her face is appropriately picked up as an image.

In addition, the PTS terminal 64 is configured to dispose the speakers 122 at the back side of the LCD display portion 101 and output the output sound from the speakers 122 from the duct 151 that is provided at each side of the LCD display portion 101, thereby eliminating a need to allocate an area of mounting the speakers 122 that require a comparatively large space, at the front side part of the PTS terminal 64, and an area of the front part of the PTS terminal 64 can be reduced accordingly. Further, there is no need to provide an area of mounting the speakers 122 at the front part of the PTS terminal 64, and the area can be utilized for mounting another unit accordingly.

Moreover, in the gaming machine 10 having the PTS terminal 64 incorporated therein, of the embodiment, the number of IC cards remaining on the card stocker 121 can be kept track of from the outside, in accordance with the light emitting mode of the LED (LED module 257) provided at the front side of the PTS terminal 64. This makes it possible to prevent an inconvenience that no IC card remains in the card stocker 121 while in a game.

[Other Embodiments]

While the foregoing embodiment described a case of the LED module 257 causing the LED to emit yellow light where the remaining number of IC cards stocked in the card stocker 121 is 1 to 5, the yellow light may be emitted where the remaining number is 5 or less, without being limitative thereto. Further, the reference number in the case of emitting the yellow light is variously applicable without being limitative to 5.

While the foregoing embodiment described a case of the LED module 257 causing the LED to emit green light in the case where the remaining number of IC cards stacked on the card stocker 121 is 25 to 29, the green light may be emitted where the remaining number is 25 or more, without being limitative thereto. Further, the reference number in the case of emitting green light is variously applicable as long as the number is more than that in the case of emitting yellow light.

In addition, while the foregoing embodiment described a case of stopping the gaming machine 10 in the case where the remaining number of IC cards stacked on the card stocker 121 is 0, the gaming machine 10 may be stopped in the case where the remaining number becomes on the order of 1 or 2, without being limitative thereto.

Further, while the foregoing embodiment described a case of stopping the gaming machine 10 in the case where the remaining number of IC cards stocked in the card stocker 121 is 30 (full), the gaming machine 10 may be stopped in the case where the remaining number is on the order of 28 or 29, for example, without being limitative thereto.

Furthermore, while the foregoing embodiment described a case of varying the light emitting color of the LED in accordance with the remaining number of stocked IC cards, a variety of modes such as varying blinking intervals are applicable without being limitative thereto.

Moreover, while the foregoing embodiment described a case of executing the processing operations shown in FIG. 17 by means of the CPU 241 of the PTS terminal 64, these processing operations may be performed by means of the controller (motherboard 40) of the gaming machine 10 without being limitative thereto. That is, the processing operation at the PTS terminal 64 may be executed by means of the controller (motherboard 40) of the gaming machine 10.

(Outline of the Gaming Machine and PTS Terminal)

A player tracking apparatus (PTS terminal 64) of the embodiment comprises: a card writer (RFID-R/W 255) for storing information related to a played result in a gaming machine 10 in an information card (IC card); a card slot 102 which inserts and ejects the information card (IC card); a card stacker 121 which stacks a plurality of information cards (IC cards); a detecting portion (RFID-R/W 255) which detects the number of cards stacked on the card stacker 121; a memory (RAM 243) which stores the detected number of cards; a light emitting portion (LED module 257) which emits light in accordance with the number of cards; and a controller (CPU 241) programmed so as to execute the following processing (A) and (B) of: (A) causing a light emitting portion (LED module 257) to emit light in a first mode (yellow) in the case where the number of cards stored in a memory (RAM 243) is a preset first reference number (5) or less; and (B) causing the light emitting portion (LED module 257) to emit light in a second mode (green) in the case where the number of cards stored in a memory (RAM 243) is a preset second reference number (25) or more.

According to this player tracking apparatus (PTS terminal 64), the number of cards remaining on the card stacker 121 can be kept track of from the outside in accordance with the light emitting mode of the light emitting portion (LED module 257). This eliminates a need to open the inside of the card stacker 121 and check the number of cards.

In addition, according to the player tracking apparatus (PTS terminal 64) of the embodiment, in addition to the abovementioned configuration, it is preferable that the controller (CPU 241) is programmed to execute the processing of (C) stopping the progress of a game in the gaming machine 10 in the case where the number of cards stored in the memory (RAM 243) becomes 0.

According to this player tracking apparatus (PTS terminal 64), in the case where the remaining number of card stackers 121 becomes 0, the progress of the game in the gaming machine 10 is stopped, thereby making it possible to prevent a game from advancing in a state in which there is no information card (IC card) having a payment stored therein.

According to the player tracking apparatus (PTS terminal 64) of the embodiment, in addition to the abovementioned configuration, it is preferable that the controller (CPU 241) is further programmed to execute the processing of (D) stopping the progress of a game in the gaming machine 10 in the case where the number of cards stored in the memory (RAM 243) is a predetermined upper limit (30).

According to this player tracking apparatus (PTS terminal 64), in the case where the remaining number of card stackers 121 is the upper limit (30), the progress of the game in the gaming machine 10 is stopped, thereby making it possible to prevent a player from forcibly inserting an information card (IC card) having information stored therein.

A control method of the player tracking apparatus (PTS terminal 64), of the embodiment, is directed to that of the player tracking apparatus (PTS terminal 64), comprising the following configuration. The player tracking apparatus (PTS terminal) comprises: a card writer (RFID-R/W 255) which stores the information related to a played result in the gaming machine 10 to information card (IC card); a card slot 102 which inserts and ejects the information card (IC card); a card stacker 121 which stacks a plurality of information cards (IC cards); a detecting portion (RFID-R/W 255) which detects the number of cards stacked on the card stacker 121; a memory (RAM 243) which stores the detected number of cards; a light emitting portion (LED module 257) which emits light in accordance with the number of cards; and a controller (CPU 241), and the control method includes the steps of: (A) the controller CPU 241) causing the light emitting portion to emit light in the first mode (yellow) in the case where the number of cards stored in the memory (RAM 243) is the preset first reference number (5) or less; and (B) the controller (CPU 241) causing the light emitting portion (LED module 257) to emit light in the second mode (green) in the case where the number of cards stored in the memory (RAM 243) is the preset second reference number (25) or more.

According to the control method of the player tracking apparatus (PTS terminal 64), the number of cards (IC cards) remaining on the card stacker 121 can be visually recognized and kept track of from the outside in accordance with the light emitting mode of the light emitting portion (LED module 257). This eliminates a need to open the inside of the card stacker 121 and check the number of cards.

The gaming machine 10 of the embodiment comprises: a display (image display panel 16) which displays a game; an operating portion (control panel 20) which is provided downward of the display (image display panel 16), providing an input for playing a game; a card writer (RFID-R/W 255) which stores information related to a played result of the game to an information card (IC card); a card slot 102 which inserts and ejects the information card (IC card); a card stacker 121 which stacks a plurality of information cards (IC cards); a detecting portion (RFID-R/W 255) which detects the number of cards stacked on the card stacker 121; a memory (RAM 243) which stores the detected number of cards; and a light emitting portion (LED module 257) which emits light in accordance with the number of cards; and a controller (CPU 241) programmed so as to execute the following processing (A) and (B) of: (A) causing the light emitting portion (LED module 257) to emit light in the first mode (yellow) in the case where the number of cards stored in the memory (RAM 243) is the preset first reference number (5) or less; and (B) causing the light emitting portion (LED module 257) in the second mode (green) in the case where the number of cards stored in the memory (RAM 243) is the preset second reference number (25) or more.

According to this gaming machine 10, the number of cards remaining on the card stacker 121 can be visually recognized and kept track of from the outside in accordance with the light emitting mode of the light emitting portion (LED module 257) provided in the gaming machine 10. This eliminates a need to open the inside of the card stacker 121 and check the number of cards.

According to the gaming machine 10 of the embodiment, in addition to the abovementioned configuration, it is preferable that the controller (CPU 241) is programmed to execute the processing of (C) executing the processing of stopping the progress of a game in the case where the number of cards stored in the memory (RAM 243) becomes 0.

According to this gaming machine 10, in the case where the remaining number of cards in the card stacker 121 becomes 0, the progress of a game is stopped, thereby making it possible to prevent a game from advancing in a state in which there is no information card (IC card) having a payment stored therein.

According to the gaming machine 10 of the embodiment, in addition to the abovementioned configuration, it is preferable that the controller (CPU 241) is further programmed to execute the processing of (D) stopping the progress of a game in the case where the number of cards stored in the memory (RAM 243) is the predetermined upper limit (30).

According to this gaming machine, in the case where the remaining number of cards in the card stacker 121 becomes the upper limit (30), the progress of a game is stopped, thereby making it possible to prevent a player from forcibly inserting an information card (IC card) having information stored therein.

The control method of the gaming machine 10, according to the invention, is directed to that of the gaming machine, comprising the following configuration. The gaming machine 10 comprises: a display (image display panel 16) which displays a game; an operating portion (control panel 20) which is provided downward of the display (image display panel 16), providing an input for playing a game; a card writer (RFID-R/W 255) which stores information related to a played result of the game to an information card (IC card); a card slot 102 which inserts and ejects the information card (IC card); a card stacker 121 which stacks a plurality of information card (IC card); a detecting portion (RFID-R/W 255) which detects the number of cards stacked on the card stacker 121; a memory (RAM 243) which stores the detected number of cards; a light emitting portion (LED module 257) which emits light in accordance with the number of cards; and a controller (CPU 241), and the control method includes the steps of: (A) causing the light emitting portion (LED module 257) to emit light in the first mode (yellow) in the case where the number of cards stored in the memory (RAM 243) is the preset first reference number (5) or less; and (B) causing the light emitting portion (LED module 257) to emit light in the second mode (green) in the case where the number of cards stored in the memory (RAM 243) is the preset second reference number (25) or more.

According to the control method of the gaming machine, the number of cards (IC cards) remaining on the card stacker 121 can be kept track of from the outside in accordance with the light emitting mode of the light emitting portion (LED module 257) of the gaming machine 10. This eliminates a need to open the inside of the card stacker 121 and check the number of cards.

The player tracking apparatus (PTS terminal 64) of the embodiment comprises: a display panel (LCD display portion 101) which displays information to be provided to a player playing at a gaming machine 10; a camera 111 provided upward of the display panel (LCD display portion 101), which picks up the player as an image; a card slot 102 provided lateral of the display panel (LCD display portion 101), inserting and ejecting an information card (IC card) storing information related to a played result in the gaming machine 10; and a cabinet (PTS panel 105) which has the display panel (LCD display portion 101), the camera 111, and the card slot 102 integrally provided therein.

According to this player tracking apparatus (PTS terminal 64), a player facing to a display panel (LCD display portion 101) can be picked up as an image by means of the camera 111 provided upward of the display panel (LCD display portion 101), and in this state, a card slot 102 is disposed lateral of the display panel (LCD display portion 101), whereby a player can insert an information card (IC card) into the card slot 102 without a need to vary the posture of the player facing to the display panel (LCD display portion 101), and can receive the information card (IC card) ejected from the card slot 102. That is, on the basis of a posture of the player facing to the display panel (LCD display portion 101) in the case where information is to be displayed, the player can be picked up as an image by means of the camera 111 with this posture being kept, and the player can insert/remove the information card (IC card) into/from the card slot 102 with the above posture being kept. In this manner, information can be provided to the player via the display panel (LCD display portion 101), and based on an image of the player picked up as an image via the camera 111, for example, specific information tailored for the player can be provided via the display panel (LCD display portion 101). That is, in the posture of the player seeing the display panel (LCD display portion 101), the player can be authenticated by means of the image of the player picked up by means of the camera 111, and based on the authentication result, specific information can be provided to the player via the display panel (LCD display portion 101). In this manner, the specific information can be reliably provided to the player. This makes it possible to provide the player with the service of enhancing usability such as enablement to insert/remove an information card (IC card) into/from the card slot 102 while a player is kept in the posture of playing a game in the gaming machine 10, and to reliably provide specific information to the player. In this manner, there can be provided a player tracking apparatus (PTS terminal 64) which is capable of sufficiently providing services to the player. In addition, in the player tracking apparatus (PTS terminal 64), the display panel (LCD display portion 101), the camera 111 and the card slot 102 are integrally provided by means of the cabinet (PTS panel 105), and a positional relationship therebetween is limited, whereby, when the player tracking apparatus (PTS terminal) is mounted to the gaming machine 10, the positions of the display panel (LCD display portion 101), the camera 111, and the card slot 102 can be kept, and the above-described provision of the services, obtained by the positional relationship between these units, can be thereby reliably effected.

According to the player tracking apparatus (PTS terminal 64) of the embodiment, in addition to the abovementioned configuration, it is preferable that the cabinet (PTS panel 105) has a human body detecting sensor 115 which detects a player, upward of the card slot 102.

According to this player tracking apparatus (PTS terminal 64), a player inserting/removing an information card (IC card) into/from a card slot 102 can be detected by means of a human body detecting sensor 115 provided upward of a card slot 102. In this manner, for example, when an information card (IC card) storing a payment is ejected from the card slot 102, in the case where a player has not been detected in front of the card slot within a predetermined period of time, ejection of the information card (IC card) is canceled. This makes it possible to avoid the occurrence of an inconvenience that, in the case where a player eligible to receive a payment is absent, the information card may be ejected to another player.

The gaming machine 10 of the embodiment comprises: a display (image display panel 16) which displays a game; an operating portion which is provided downward of the display (image display panel 16), providing an input for playing the game; a display panel (LCD display portion 101) which displays information to be provided to a player playing the game; a camera 111 provided upward of the display panel (LCD display portion 101), which picks up the player as an image; a card slot 102 provided lateral of the display panel (LCD display portion 101), inserting and ejecting an information card (IC card) storing information related to a played result in a gaming machine 10; and a cabinet which has the display panel (LCD display portion 101), the camera 111, and the card slot 102 that are integrally provided in an area between the display (image display panel 16) and the operating portion (control panel 20).

According to this gaming machine 10, a player facing to the display (image display panel 16), the display panel (LCD display portion 101), and the operating portion (control panel 20) (the player playing a game, facing to the gaming machine 10) can be picked up as an image by means of the camera 111 provided upward of the display panel (LCD display portion 101). In addition, in this state, the card slot 102 is disposed lateral of the display panel (LCD display portion 101), whereby the player can insert an information card (IC card) into the card slot 102 and can receive the information card (IC card) ejected from the card slot 102, without a need to vary the posture. That is, on the basis of a posture of the player facing to the gaming machine 10, the player can be picked up as an image by means of the camera 111 with this posture being kept, and the player can insert or remove the information card (IC card) into/from the card slot 102 with the above posture being kept. In this manner, information can be provided via the display panel (LCD display portion 101) to the player facing to the gaming machine (display (image display panel 16), display panel (LCD display portion 101), and operating portion (control panel 20)), and based on an image of the player picked up as an image via the camera 111, for example, specific information tailored for the player can be provided via the display panel (LCD display portion 101). That is, in the posture of the player facing to the gaming machine 10, the player can be authenticated by means of the image of the player picked up as an image by the camera 111, and based on the authentication result, specific information can be provided to the player via the display panel (LCD display portion 101). In this manner, the specific information can be reliably provided to the player. This makes it possible to provide the player with the service of enhancing usability such as enablement to insert/remove an information card (IC card) into/from the card slot 102 while a player is kept in the posture of playing a game in the gaming machine 10, and to reliably provide specific information to the player. In this manner, there can be provided a gaming machine 10 which is capable of sufficiently providing service to a player. In addition, in the player tracking apparatus (PTS terminal 64), the display panel (LCD display portion 101), the camera 111, and the card slot 102 are integrally provided by means of a cabinet, and a positional relationship therebetween is limited, whereby, when these units are mounted to the gaming machine 10, the positions of the display panel (LCD display portion 101), the camera 111, and the card slot 102 can be kept, and the above-described provision of service, obtained according to the positional relationship between these units, can be thereby reliably effected.

According to the gaming machine 10 of the embodiment, in addition to the abovementioned configuration, it is preferable that the abovementioned cabinet has a human body detecting sensor 115 which detects a player, upward of the card slot 102.

According to this gaming machine 10, a player inserting/removing an information card (IC card) into/from the card slot 102 can be detected by means of the human body detecting sensor 115 that is provided upward of the card slot 102. In this manner, for example, when an information card (IC card) storing a payment is ejected from the card slot, in the case where a player has not been detected in front of the card slot 102 within a predetermined period of time, ejection of the information card (IC card) is canceled. This makes it possible to avoid the occurrence of an inconvenience that, in the case where a player eligible to receive a payment is absent, the information card may be ejected to another player.

According to the gaming machine 10 of the embodiment, in addition to the abovementioned configuration, it is preferable that: the cabinet (PTS panel 105) allows first and second speakers 122 to be provided at the back side of the display panel (LCD display portion 101); and ducts 151 for voice output, of the first and second speakers 122, be provided at the left and right of the display panel (LCD display portion 101).

According to this gaming machine 10, the speakers 122 that are unavoidable to be comparatively bulky in area are disposed at the back side of the display panel (LCD display portion 101), whereby the area of a region for disposing the display panel (LCD display portion 101) can be reduced. The voice output from the speakers 122 is output from the front side of the display panel (LCD display portion 101) via the ducts 151 for voice output. In this manner, the voice from the speakers 122 that are disposed behind the back side of the display panel (LCD display portion 101) can be reliably output from the front side.

What is claimed is:

1. A player tracking apparatus that communicates with a management server for authenticating a player, comprising:

a display panel which displays information to be provided to a player playing at a gaming machine when the player is authenticated by the management server;

a camera which picks up the player as an image for an authentication of the player at the management server;

a card slot which is provided lateral of the display panel, inserting and ejecting an information card storing information related to a played result in the gaming machine;

a cabinet which has the display panel, the camera, and the card slot integrally provided therein;

a card stacker which stacks the information cards in plurality;

a detecting portion which detects the number of cards stacked on the card stacker;

a memory which stores the detected number of cards;

a light emitting portion which emits light in accordance with the number of cards; and a controller which is programmed to execute the processing of (A) causing the light emitting portion to emit light in a first mode in a case where the number of cards stored in the memory is a first reference number or less and is more than 0, (B) causing the light emitting portion to emit light in a second mode in a case where the number of cards stored in the memory is a second reference number or more and is less than a upper limit, (C) stopping a game executed in the gaming machine in a case where the number of cards stored in the memory is 0, and (D) stopping the game in a case where the number of cards stored in the memory is the upper limit.

2. The player tracking apparatus according to claim 1, further comprising:

a card writer which stores the information related to the played result in the gaming machine to an information card.

3. The player tracking apparatus according to claim 1, wherein a face image of each of players is stored to the management server, in association with an ID of each player and personal information of each player at a time of information card issuance for each player.

4. A control method of a player tracking apparatus that communicates with a management server for authenticating a player, the player tracking apparatus comprising:

a display panel which displays information to be provided to a player playing at a gaming machine when the player is authenticated by the management server;

a camera which picks up the player as an image for an authentication of the player at the management server;

a card slot which is provided lateral of the display panel, inserting and ejecting an information card storing information related to a played result in the gaming machine; and a cabinet which has the display panel, the camera, and the card slot integrally provided therein;

a card writer which stores the information related to the played result in the gaming machine to an information card;

a card stacker which stacks the information card in plurality;

a detecting portion which detects the number of cards stacked on the card stacker;

a memory which stores the detected number of cards;

a light emitting portion which emits light in accordance with the number of cards; and a controller, the control method including the steps of:

(A) the controller causing the light emitting portion to emit light in a first mode in a case where the number of cards stored in the memory is a first reference number or less and is more than 0;

(B) the controller causing the light emitting portion to emit light in a second mode in a case where the number of cards stored in the memory is a second reference number or more and is less than a upper limit;

(C) the controller stopping a game executed in the gaming machine in a case where the number of cards stored in the memory is 0; and (D) the controller stopping the game in a case where the number of cards stored in the memory is the upper limit.

5. The control method according to claim 4, wherein a face image of each of players is stored to the management server, in association with an ID of each player and personal information of each player at a time of information card issuance for each player.

6. A gaming machine that communicates with a management server for authenticating a player, comprising:

a display which displays a game;

an operating portion which is provided downward of the display, providing an input for playing the game;

a display panel which displays information to be provided to a player playing the game when the player is authenticated by the management server;

a camera which picks up the player as an image for an authentication of the player at the management server;

a card slot which is provided lateral of the display panel, inserting and ejecting an information card storing the information related to the played result in the gaming machine;

a cabinet which has the display panel, the camera, and the card slot integrally provided in an area between the display and the operating portion;

a card stacker which stacks the information card in plurality;

a detecting portion which detects the number of cards stacked on the card stacker;

a memory which stores the detected number of cards;

a light emitting portion which emits light in accordance with the number of cards; and a controller which is programmed to execute the processing of:

(A) causing the light emitting portion to emit light in a first mode in a case where the number of cards stored in the memory is a first reference number or less and is more than 0, (B) causing the light emitting portion to emit light in a second mode in a case where the number of cards stored in the memory is a second reference number or more and is less than a upper limit, (C) stopping a game executed in the gaming machine in a case where the number of cards stored in the memory is 0, and (D) stopping the game in a case where the number of cards stored in the memory is the upper limit.

7. The gaming machine according to claim 6, further comprising:

a card writer which stores the information related to the played result in the gaming machine to an information card.

8. A control method of a gaming machine that communicates with a management server for authenticating a player, the gaming machine comprising:

a display which displays a game;

an operating portion which is provided downward of the display, providing an input for playing the game;

a display panel which displays information to be provided to a player playing the game when the player is authenticated by the management server;

a camera which picks up the player as an image for an authentication of the player at the management server;

a card slot which is provided lateral of the display panel, inserting and ejecting an information card storing the information related to the played result in the gaming machine;

a cabinet which has the display panel, the camera, and the card slot integrally provided in an area between the display and the operating portion;

a card writer which stores the information related to the played result of the game to an information card;

a card stacker which stacks the information card in plurality;

a detecting portion which detects the number of cards stacked on the card stacker;

a memory which stores the detected number of cards;

a light emitting portion which emits light in accordance with the number of cards; and a controller, the control method including the steps of:

(A) the controller causing the light emitting portion to emit light in a first mode in a case where the number of cards stored in the memory is a first reference number or less and is more than 0;

(B) the controller causing the light emitting portion to emit light in a second mode in a case where the number of cards stored in the memory is a second reference number or more and is less than a upper limit;

(C) the controller stopping a game executed in the gaming machine in a case where the number of cards stored in the memory is 0; and (D) the controller stopping the game in a case where the number of cards stored in the memory is the upper limit.

9. The control method according to claim 8, wherein a face image of each of players is stored to the management server, in association with an ID of each player and personal information of each player at a time of information card issuance for each player.

* * * * *